United States Patent
Yamamura et al.

(10) Patent No.: US 7,799,412 B2
(45) Date of Patent: Sep. 21, 2010

(54) POLYLACTIC ACID-BASED RESIN LAMINATE SHEET AND MOLDED PRODUCT THEREFROM

(75) Inventors: Go-hei Yamamura, Otsu (JP); Hiroshi Shinnumadate, Otsu (JP); Masahiro Kimura, Kyoto (JP)

(73) Assignee: Toray Industries, Inc. (JP)

( * ) Notice: Subject to any disclaimer, the term of this patent is extended or adjusted under 35 U.S.C. 154(b) by 89 days.

(21) Appl. No.: 12/094,610

(22) PCT Filed: Nov. 29, 2006

(86) PCT No.: PCT/JP2006/323751

§ 371 (c)(1),
(2), (4) Date: May 22, 2008

(87) PCT Pub. No.: WO2007/063864

PCT Pub. Date: Jun. 7, 2007

(65) Prior Publication Data

US 2009/0169844 A1 Jul. 2, 2009

(30) Foreign Application Priority Data

Nov. 30, 2005 (JP) .............. 2005-345352
Jan. 6, 2006 (JP) .............. 2006-001132
Jul. 5, 2006 (JP) .............. 2006-185207

(51) Int. Cl.
B32B 7/02 (2006.01)
B32B 27/08 (2006.01)
B32B 27/18 (2006.01)
B32B 27/30 (2006.01)
B32B 27/36 (2006.01)

(52) U.S. Cl. ............. 428/212; 428/480; 428/483; 428/522; 428/402; 428/403; 428/407; 525/88; 525/165; 525/176

(58) Field of Classification Search .......... None
See application file for complete search history.

(56) References Cited

U.S. PATENT DOCUMENTS

| | | | | |
|---|---|---|---|---|
| 5,216,050 A | * | 6/1993 | Sinclair | 524/108 |
| 5,300,576 A | * | 4/1994 | Nemphos et al. | 525/190 |
| 5,568,316 A | * | 10/1996 | Schrenk et al. | 359/584 |
| 5,798,436 A | * | 8/1998 | Gruber et al. | 528/354 |
| 5,847,011 A | * | 12/1998 | Terado et al. | 521/48 |
| 5,849,374 A | * | 12/1998 | Gruber et al. | 428/34.3 |
| 5,849,401 A | * | 12/1998 | El-Afandi et al. | 428/215 |
| 5,939,467 A | * | 8/1999 | Wnuk et al. | 523/128 |
| 6,087,007 A | * | 7/2000 | Fujii et al. | 428/412 |
| 6,426,128 B1 | * | 7/2002 | Kimmel et al. | 428/1.6 |
| 6,875,808 B2 | * | 4/2005 | Weier et al. | 524/504 |
| 6,908,652 B1 | * | 6/2005 | Miranda et al. | 428/36.7 |
| 7,208,550 B2 | * | 4/2007 | Mather et al. | 525/199 |
| 2007/0032577 A1 | * | 2/2007 | Kanzawa et al. | 524/31 |
| 2008/0071008 A1 | * | 3/2008 | Smillie et al. | 523/201 |
| 2008/0071018 A1 | * | 3/2008 | Smillie et al. | 524/437 |
| 2009/0053489 A1 | * | 2/2009 | Yamamura et al. | 428/213 |

FOREIGN PATENT DOCUMENTS

| | | | |
|---|---|---|---|
| EP | 1 264 684 | * | 12/2002 |
| JP | 8-59949 A | | 3/1996 |
| JP | 2001-277454 A | | 10/2001 |
| JP | 2002-155207 A | | 5/2002 |
| JP | 2003-191425 | * | 7/2003 |
| JP | 2003-191425 A | | 7/2003 |
| JP | 2004-269720 | * | 9/2004 |
| JP | 2004-351629 A | | 12/2004 |
| JP | 2005-2174 A | | 1/2005 |
| JP | 2005-036054 | * | 2/2005 |
| JP | 2005-36054 A | | 2/2005 |
| JP | 2005-171204 | * | 6/2005 |
| JP | 2005-171204 A | | 6/2005 |
| JP | 2005-212242 A | | 8/2005 |
| WO | WO 2004/087812 | * | 10/2004 |
| WO | WO 2006/002372 | * | 1/2006 |

OTHER PUBLICATIONS

Machine translation of WO 2005/087812.*
J.L. Eguiburu et al., "Blends of amorphous and crystalline polylactides with poly(methyl methacrylate) and poly(methyl acrylate): a miscibility study," *Polymer*, vol. 39, No. 26, 1998, pp. 6891-6897.
Maurizio Avella et al., "Radical polymerization of methyl methacrylate in the presence of biodegradable poly($_L$-lactic acid). Preparation of blends, chemical-physical characterization and morphology," *Macromol. Chem. Phys.*, vol. 201, No. 12, 2000, pp. 1295-1302.

* cited by examiner

*Primary Examiner*—Vivian Chen
(74) *Attorney, Agent, or Firm*—DLA Piper LLP (US)

(57) ABSTRACT

The polylactic acid-based resin laminate sheet is a laminate sheet including Layer A and Layer B of a polylactic acid-based resin composition, and the Layer A and the Layer B contain poly(meth)acrylate in a specified amount. The laminate sheet is excellent in transparency and heat resistance and, in addition, provides a polylactic acid-based resin laminate sheet capable of obtaining a molded product of high biobased content therefrom.

8 Claims, No Drawings

POLYLACTIC ACID-BASED RESIN LAMINATE SHEET AND MOLDED PRODUCT THEREFROM

RELATED APPLICATIONS

This is a §371 of International Application No. PCT/JP2006/323751, with an international filing date of Nov. 29, 2006 (WO 2007/063864 A1, published Jun. 7, 2007), which is based on Japanese Patent Application Nos. 2006-345352, filed Nov. 30, 2005, 2006-001132, filed Jan. 6, 2006, and 2006-185207, filed Jul. 5, 2006.

TECHNICAL FIELD

This disclosure relates to a polylactic acid-based resin laminate sheet, having a high biobased content, for obtaining molded products such as various kinds of shape retainers and containers which require heat resistance, transparency and impact resistance, and a molded product obtainable by using the same.

BACKGROUND

In recent years, along with the increase of environmental awareness, waste disposal problem of plastic products has drawn attention, and regarding shape retainers such as used for presentation packaging for various commercial products and containers such as trays for food or beverage cups, those in which various biodegradable plastic sheets are used has been developed. Among them, in particular, polylactic acid has drawn attention most as an expectable material, because its glass transition temperature is high as approximately 60° C. among biodegradable plastics and because of its transparency.

However, the glass transition temperature of the polylactic acid is low by approximately 20° C. compared to conventional materials derived from petroleum, i.e., polyethylene terephthalate, and there is a problem that heat resistance is insufficient for replacing each of present applications by the polylactic acid.

By the way, it is well known to mix 2 kinds or more of polymers with each other as a polymer blend or a polymer alloy, and it is widely applied for improving respective defects of the polymers. However, it is general that, when two kinds of polymers are mixed, the mixture is separated into respective phases in most cases, and one of the phases has nonuniform macro dispersion structure of several microns or more. In cases of such dispersion configuration, the mixture is not transparent, and also low in mechanical strength, and further, when it, is extruded in a molten and mixed state, Barus effect is likely to occur to decrease productivity in most cases. On the other hand, in very few cases, 2 polymers are uniformly mixed, which are called as compatible polymers or miscible polymers, and expected to exhibit excellent characteristics, but such cases are limited.

As methods for mixing with a resin having compatibility with polylactic acid, for example, it is known that, by mixing with polymethyl methacrylate of which glass transition temperature is approximately 100° C., glass transition temperature of the resin composition is improved (refer to Polymer, 39 (26), 6891 (1998) and Macromol. Chem. Phys., 201, 1295 (2000)). In addition, it is known that, by mixing α-hydroxycarboxylic acid polymer containing polylactic acid and poly(meth)acrylate resin, a resin excellent in hydrolysis behavior is produced (refer to JP-H8-59949 A) or that a resin composition excellent in weather resistance and mold processing behavior can be obtained by compounding acrylic compound into polylactic acid (refer to JP 2002-155207 A), but none of them discloses about an improvement of heat resistance or rigidity at high temperature.

On the other hand, in JP 2005-36054 A, it is described that a film made by mixing polylactic acid and poly(meth)acrylate-based resin and by stretching at least monoaxially is excellent in rigidity at high temperature, in JP 2005-171204 A, it is described that, compatibility is remarkably improved in case of polymethyl methacrylate of weight average molecular weight 20,000 to 300,000 and polylactic acid and only one Tg appears at center of the Tgs of the two resins, and heat resistance is improved, but any of them does not disclose at all about a technical idea in which heat resistance and biobased content, or impact resistance are compatible, and there is also no suggestion for solving the problem.

It could therefore be advantageous to provide a polylactic acid-based resin laminate sheet excellent in heat resistance, transparency and impact resistance and, furthermore, capable of obtaining a molded product of which biobased content is high, and a molded product therefrom.

SUMMARY

We provide polylactic acid-based resin laminate sheets which are polylactic acid-based resin laminate sheets including Layer A and Layer B of polylactic acid-based resin compositions containing poly(meth)acrylate-based resin and Layer A and Layer B satisfying the following condition:

$0 < Xa < Xb$ wherein,
Xa: containing ratio (mass %) of poly(meth)acrylate-based resin with respect to the whole polylactic acid-based resin composition constituting the Layer A
Xb: containing ratio (mass %) of poly(meth)acrylate-based resin with respect to the whole polylactic acid-based resin composition constituting the Layer B.

A polylactic acid-based resin laminate sheet capable of obtaining a molded product excellent in heat resistance, transparency and impact resistance is provided. Furthermore, a polylactic acid-based resin laminate sheet capable of obtaining a molded product of which biobased content is high is provided. The laminate sheet of polylactic acid-based resin can be preferably used for molded product applications which require heat resistance and impact resistance such as various shape retainers including blister pack, containers such as trays for food or cups for beverage, or bottles for display of beverage vending machine.

DETAILED DESCRIPTION

As a result of extensive research on the above-mentioned problem, i.e., on polylactic acid-based resin laminate sheet capable of obtaining a molded product excellent in heat resistance and impact resistance, and furthermore, of which biobased content is high, we found that by simultaneously compounding a specific resin into Layer B only, or by laminating Layer A and Layer B after containing the specific resin in Layer A and Layer B in a specific content ratio, excellent laminate sheets may be produced.

The weight average molecular weight of polylactic acid-based resin to satisfy an appropriate film forming and stretching abilities and practical mechanical characteristics, 50,000 to 500,000 is preferable, more preferably 100,000 to 250,000. The weight average molecular weight mentioned here is a molecular weight measured by gel permeation chromatography in chloroform solvent and calculated as the polymethyl methacrylate equivalent.

The polylactic acid-based resin is a polymer of which main constituent is L-lactic acid and/or D-lactic acid units, but it may contain other copolymerization component than lactic acid. As the copolymerization component, monomers such as glycol compounds including ethylene glycol, propylene glycol, butane diol, heptanediol, hexane diol, octane diol, nonane diol, decane diol, 1,4-cyclohexane dimethanol, neopentyl glycol, glycerin, pentaerythritol, bisphenol A, polyethylene glycol, polypropylene glycol and polytetramethylene glycol, dicarboxylic acids including oxalic acid, adipic acid, sebacic acid, azelaic acid, dodecane dioic acid, malonic acid, glutaric acid, cyclohexane dicarboxylic acid, terephthalic acid, isophthalic acid, phthalic acid, naphthalene dicarboxylic acid, bis (p-carboxyphenyl) methane, anthracene dicarboxylic acid, 4,4'-diphenyl ether dicarboxylic acid, 5-sodium sulfoisophthalate and 5-tetrabutyl phosphonium isophthalate, hydroxycarboxylic acids including glycolic acid, hydroxypropionic acid, hydroxybutyric acid, hydroxyvaleric acid, hydroxycaproic acid and hydroxybenzoic acid, lactones including caprolactone, valerolactone, propiolactone, undecalactone and 1,5-oxepane-2-on, can be mentioned. Regarding the amount of copolymerization of the above-mentioned other copolymerization component with respect to the whole monomer component, 0 to 30 mol % is preferable and 0 to 10 mol % is more preferable.

To obtain a molded article having a high heat resistance, it is preferable to select those, as the polylactic acid-based resin, of which optical purity of lactic acid component is high. That is, it is preferable that, in the whole lactic acid component of the polylactic acid-based resin, L-isomer is contained in 80 mol % or more and 100 mol % or less or D-isomer is contained in 80 mol % or more and 100 mol % or less; it is more preferable that L-isomer is contained in 90 mol % or more and 100 mol % or less or D-isomer is contained in 90 mol % or more and 100 mol % or less; and it is especially preferable that L-isomer is contained in 95 mol % or more and 100 mol % or less or D-isomer is contained in 95 mol % or more and 100 mol % or less.

As production method of such polylactic acid-based resin, details are mentioned later but, known polymerization methods, i.e., a direct polymerization from lactic acid, a ring-opening polymerization via lactide, etc., can be employed.

The melting point of polylactic acid-based resin is not especially limited, but it is preferable to be 120° C. or more, and to be 150° C. or more is more preferable. In general, such melting point of the polylactic acid-based resin becomes high as the optical purity of lactic acid component is raised high, and a polylactic acid resin of melting point of 120° C. or more can be obtained by containing L-isomer in 90 mol % or more and 100 mol % or less or by containing D-isomer in 90 mol % or more and 100 mol % or less, and a polylactic acid resin of melting point of 150° C. or more can be obtained by containing L-isomer in 95 mol % or more and 100 mol % or less or containing D-isomer in 95 mol % or more and 100 mol % or less.

The poly(meth)acrylate is that having at least one monomer selected from acrylate or methacrylate as its constituting unit and 2 or more monomers may be used by copolymerization. As the acrylate and methacrylate constituting the poly (meth)acrylate, for example, acrylates such as methyl acrylate, ethyl acrylate, n-propyl acrylate, n-butyl acrylate, cyanoethyl acrylate and cyanobutyl acrylate, and methacrylates such as methyl methacrylate, ethyl methacrylate, cyclohexyl methacrylate and 2-hydroxyethyl methacrylate, can be used, but to impart a higher rigidity at high temperature, it is most preferable to use polymethyl methacrylate.

The copolymerization method of at least one kind monomer selected from these acrylates and methacrylate is not especially limited, and a known polymerization method such as a block polymerization, a solution polymerization, a suspension polymerization or the like can be employed.

In the case where polymethyl methacrylate is used as the poly(meth)acrylate-based resin, from the view point of compatibility with the polylactic acid resin and from the view point of viscosity control of respective layers at laminate film forming, a polymethyl methacrylate of which flowability measured at 230° C. and under a load of 37.2N based on JIS K7210 is 1 to 50 g/10 min is preferable, 5 to 45 g/10 min is further preferable, and 10 to 40 g/10 min is especially preferable.

It is preferable that a weight average molecular weight of poly(meth)acrylate-based resin is 20,000 to 500,000, to be 50,000 to 500,000 is more preferable, to be 70,000 to 200,000 is further preferable and to be 100,000 to 200,000 is especially preferable. That is, when the weight average molecular weight is less than 20,000, strength of the sheet or molded article may decrease and when the weight average molecular weight exceeds 500,000, viscosity unevenness may occur or moldability may become poor at laminate film forming. The weight average molecular weight mentioned here is a weight average molecular weight measured by gel permeation chromatography in hexafluoroisopropanol solvent and calculated therefrom into polymethyl methacrylate equivalent.

The polylactic acid-based resin laminate sheet has Layer A and Layer B comprising the above-mentioned polylactic acid-based resin composition containing the above-mentioned poly(meth)acrylate-based resin, and it is necessary that Layer A and Layer B satisfy the following condition:

$$0<Xa<Xb$$

Xa: containing ratio (wt %) of poly(meth)acrylate-based resin with respect to whole polylactic acid-based resin composition constituting Layer A Xb: containing ratio (wt %) of poly(meth)acrylate-based resin with respect to whole polylactic acid-based resin composition constituting Layer B.

It is more preferably $$0<2Xa<Xb$$

and further preferably $$0<3Xa<Xb.$$

The whole resin composition mentioned here means all components in the sheet or in the layer including inorganic substances or organic low molecular weight molecules.

In the case where Xa and Xb do not satisfy the above-mentioned relation equation, it becomes impossible to satisfy all of heat resistance, impact resistance and biobased content of the sheet. That is, if the poly(meth)acrylate-based resin is compounded in all layers of the sheet in a same ratio to impart a predetermined heat resistance, impact resistance becomes poor and biobased content also becomes low.

A concrete containing ratio of the poly(meth)acrylate-based resin is, as to Layer A, 0 to 70 wt % with respect to the whole resin composition constituting Layer A is preferable, more preferably it is 0 to 50 wt %, further more preferably 0 to 30 wt %, still more preferably 0 to 15 wt %, still especially preferably 0 to 10 wt %, most preferably 0 to 5 wt %. In the case where containing ratio of the poly(meth)acrylate-based resin exceeds 70 wt %, biobased content of the sheet as the whole sheet may becomes low.

In addition, as to Layer B, it is preferable that a containing ratio of the poly(meth)acrylate-based resin constituting Layer B is 30 to 100 wt % with respect to the whole resin composition, more preferably it is 40 to 100 wt %, further more preferably 50 to 100 wt %, most preferably 60 to 80 wt %. If the containing ratio is less than 30 wt %, heat resistance of the sheet may become insufficient.

If Xa and Xb satisfy the above-mentioned relation equation, it is preferable from the view point of collectibility at the time of production of the polylactic acid-based resin laminate sheet. That is, in an actual production, edge portions of sheet, or sheets which could not be sold are collected, pelletized and recycled as a taw material in many cases. At that time, if Xa, Xb satisfy the above-mentioned relation equation, for example, collected raw material of sheet of its layer constitution is B/A/B can be used as a raw material of Layer A by a dilution.

By the way, the polylactic acid-based resin is a biomass, i.e., recyclable resource derived from lives, in concrete, produced from plants such as corn or sweet potato as raw materials. Accordingly, use of the resin directly results in an increase of the biobased content of the sheet. Since the biomass is produced by plants from carbon dioxide in the air and water, it does not increase carbon dioxide in the air even if it is decomposed or burned. Accordingly, it is helpful for preventing global warning which is afraid of in recent years, and it also can cope with the petroleum resource depletion. By making a sheet into a laminate structure and by prescribing a relation of containing ratio of poly(meth)acrylate-based resin of each layer, it becomes possible to make it into a sheet of which biobased content is high while exhibiting heat resistance.

From the view point of the above-mentioned biobased content, in the polylactic acid-based resin laminate sheet, it is preferable that the containing ratio of polylactic acid resin with respect to the whole resin composition constituting the sheet is 10 to 95 wt %. It is more preferably, 20 to 95 wt %, still more preferably 25 to 95 wt %, especially preferably 50 to 95 wt %, still especially preferably 55 to 93 wt % and most preferably 60 to 90 wt %. When the containing ratio of the polylactic acid-based resin exceeds 95 wt %, heat resistance of the sheet may become insufficient.

The polylactic acid-based resin laminate sheet has Layer A and Layer B of polylactic acid-based resin compositions which contain the poly(meth)acrylate-based resin, and it is necessary that Layer A and Layer B satisfy the relation of 0<Xa<Xb, and by this feature, it is possible to improve heat resistance, impact resistance and biobased content of the sheet, but in the polylactic acid-based resin laminate sheet, to further improve impact resistance of the sheet or a molded product in which the sheet is used, it is preferable to contain an impact resistance improver.

The impact resistance improver is not especially limited as far as it can be used for improving impact resistance of thermoplastic resins. For example, at least 1 kind compound selected from the following various kinds of impact resistance improver can be used.

That is, as concrete examples of the impact resistance improver, polyester-based resin, polyethylene, polypropylene, ethylene propylene copolymer, ethylene propylene non-conjugate diene copolymer, ethylene butene-1copolymer, various acrylic rubbers, (acrylic-based) core-shell type organic fine particle, ethylene acrylic acid copolymer and alkali metal salt thereof (so-called ionomer), ethylene glycidyl (meth)acrylate copolymer, ethylene acrylic acid alkyl ester copolymer (for example, ethylene ethyl acrylate copolymer, ethylene butyl acrylate copolymer), acid-modified ethylene propylene copolymer, diene rubber (for example, polybutadiene, polyisoprene, polychloroprene), copolymer of diene and vinyl monomer (for example, styrene-butadiene random copolymer, styrene-butadiene block copolymer, styrene-butadiene styrene block copolymer, styrene isoprene random copolymer, styrene isoprene block copolymer, styrene isoprene styrene block copolymer, graft-copolymerized polybutadiene with styrene, butadiene acrylonitrile copolymer), polyisobutylene, copolymer of isobutylene with butadiene or isoprene, natural rubber, thiokol rubber, polysulfide rubber, acrylic rubber, silicone rubber, polyurethane rubber, polyether rubber, epichlorohydrin rubber, polyester-based elastomer, and polyamide-based elastomer, etc., of which glass transition temperature is 60° C. or less can be used. Furthermore, those having various degree of cross-linking or those having various micro structures, for example, cis-structure, trans-structure, etc., can be used.

The various (co)polymer mentioned in the above-mentioned concrete examples can be used as impact resistance improver even if it is any one of random copolymers, block copolymers, graft copolymers, etc., and further, at preparing these (co)polymers, it is possible to copolymerize a monomer such as other olefins, dienes, aromatic vinyl compounds, acrylic acid, acrylate esters and methacrylate esters.

Among these impact resistance improvers, polyester-based resins of which glass transition temperature is 60° C. or less can be preferably used.

In general, impact resistance and softness of polymer correlate with each other, and glass transition temperature is mentioned as a parameter for evaluating the polymer softness. That is, to improve impact resistance of the polylactic acid-based resin laminate sheet, as the polyester-based resin, of which glass transition temperature is 60° C. or less, used as the impact resistance improver, in consideration of glass transition temperature of the polylactic acid-based resin, it is preferable to use those of which glass transition temperature are 60° C. or less.

There is especially no limit in a weight average molecular weight of the polyester-based resin, of which glass transition temperature is 6° C. or less, used for the impact resistance improver, but mainly from the view point of maintaining heat resistance and from the view point of compatibility with polylactic acid resin, there are preferable values for respective upper and lower limits, and in concrete, it is preferable to be 2,000 to 200,000, more preferably 5,000 to 100,000 and still more preferably 10,000 to 80,000.

There is especially no limitation in kind of the polyester-based resin of which glass transition temperature is 60° C. or less, but it is preferable to be an aromatic and/or aliphatic polyester, or a resin composition constituted with a polyester-based and/or polyether-based segment and polylactic acid segment.

As concrete examples of the aromatic and/or aliphatic polyester, polybutylene terephthalate, polypropylene terephthalate, polybutylene sebacate, polybutylene succinate, polybutylene succinate/terephthalate, polybutylene adipate/terephthalate, polybutylene adipate/succinate, polypropylene sebacate, polypropylene succinate, polypropylene succinate/terephthalate, polypropylene adipate/terephthalate, polypropylene adipate/succinate or the like can be used. Among them, in particular, polybutylene adipate/terephthalate and polybutylene succinate/adipate are effective for imparting impact resistance and preferably used.

In addition, in the case where a resin composition constituted with a polyester-based and/or polyether-based segment and polylactic acid segment is used as the polyester-based resin, of which glass transition temperature is 60° C. or less, used for an impact resistance improver, it is more preferable to be a block copolymer of a polyether-based and/or polyester-based resin and polylactic acid resin. In addition, it is preferable that one or more polylactic acid segments of which weight average molecular weight is 1,500 or more are contained per one block copolymer molecule. In this case, by being the polylactic acid segment embedded in crystals formed with the polylactic acid-based polymer which is mother material, a function of being anchored to the mother material is generated and it becomes possible to sufficiently prevent a bleed out of the block copolymer.

In the case where the resin composition constituted with the polyester-based and/or polyether-based segment and polylactic acid segment is used as the polyester-based resin, of which glass transition temperature is 60° C. or less, used for an impact resistance improver, as concrete examples of polyether constituting the polyether-based segment, polyethylene glycol, polypropylene glycol, polytetramethylene glycol, polyethylene glycol polypropylene glycol copolymer or the like are mentioned.

In the case where the resin composition constituted with the polyester-based and/or polyether-based segment and polylactic acid segment is used as the polyester-based resin, of which glass transition temperature is 60° C. or less, used for an impact resistance improver, as concrete examples of polyester constituting the polyester-based segment, polybutylene terephthalate, polypropylene terephthalate, polybutylene sebacate, polybutylene succinate, polybutylene succinate/terephthalate, polybutylene adipate/terephthalate, polybutylene adipate/succinate, polypropylene sebacate, polypropylene succinate, polypropylene succinate/terephthalate, polypropylene adipate/terephthalate, polypropylene adipate/succinate or the like can be used.

As the polylactic acid-based resin laminate sheet, those in which the above-mentioned polyester-based resin, of which glass transition temperature is 60° C. or less, is contained in a dispersed state are preferably used, but in such a case, it is preferably contained in a form of dispersed diameter of 0.1 μm or less, further preferably 0.05 μm or less, and especially preferably 0.01 μm or less. That is, when the dispersed diameter exceeds 0.1 μm, transparency of the sheet may decrease or an improvement of impact resistance may not be exhibited.

In addition, another impact resistance improver capable of being preferably used is a core-shell type multilayer structure organic fine particle. The core-shell type is those having a multilayer structure comprising a core portion and at least 1 or more shell portions covering thereon. The number of layers constituting the multilayer structure is not especially limited, and it may be 2 layers or more.

The core-shell type multilayer structure organic fine particle preferably used exhibits impact resistance by a rubber layer mainly contained in the core portion and exhibits compatibility with the polylactic acid-based resin by a polymer component having thermoplasticity mainly contained in the shell portion.

It is preferable that the above-mentioned core-shell type multilayer structure organic fine particle has in inside at least 1 layer or more of a rubber layer. The kind of the rubber layer is not especially limited, and it may be those constituted with a polymer component having rubber elasticity. For example, those rubbers constituted with a polymer of a (meth)acrylic component, a silicone component, a styrene component, a nitrile component, a conjugated diene component, an urethane component or an ethylene propylene component, etc., can be used. Preferable rubbers are those rubbers constituted with a polymer of, for example, a (meth)acrylic component such as ethyl (meth)acrylate unit, butyl (meth)acrylate unit, 2-ethyl hexyl (meth)acrylate unit and benzyl (meth)acrylate unit, a silicone component such as dimethyl siloxane unit or phenyl methyl siloxane unit, a styrene component such as styrene unit or α-methyl styrene unit, a nitrile component such as acrylonitrile unit or methacrylonitrile unit, or a conjugated diene component such as butane diene unit or isoprene unit. Other than these components, cross-linked rubbers cross-linked by copolymerizing a cross-linkable component such as divinyl benzene unit, allyl (meth)acrylate unit or butylene glycol diacrylate unit are also preferable. Among them, from the view point of transparency and impact resistance, as the rubber layer, a cross-linked rubber is preferable and a cross-linked rubber of which glass transition temperature is 0° C. or less is more preferable, and as such a kind of rubber layer, it is especially preferable to appropriately select from ethyl acrylate unit, 2-ethyl hexyl acrylate unit, butyl acrylate unit, benzyl acrylate unit and allyl methacrylate unit, and use together.

The kind of other layer than the rubber layer of the multilayer structure organic fine particle used is not especially limited as far as it is constituted with a polymer component having thermoplasticity, but from the view point of transparency, heat resistance and impact resistance, it is preferable to be a polymer of which glass transition temperature is higher than that of the rubber layer. As polymers having such a thermoplasticity, a polymer containing at least one kind or more selected from an unsaturated carboxylic acid alkyl ester-based unit, a glycidyl group containing vinyl-based unit, an unsaturated dicarboxylic acid anhydride-based unit, an aliphatic vinyl-based unit, an aromatic vinyl-based unit, a cyanided vinyl-based unit, a maleimide-based unit, an unsaturated dicarboxylic acid-based unit or other vinyl-based unit, etc., can be used, and among them, a polymer containing at least one kind or more selected from unsaturated carboxylic acid alkyl ester-based unit, unsaturated glycidyl group containing unit and unsaturated dicarboxylic acid anhydride-based unit, is preferable, and furthermore, a polymer containing at least one kind or more selected from unsaturated glycidyl group containing unit and unsaturated dicarboxylic acid anhydride-based unit is more preferably used.

The unsaturated carboxylic acid alkyl ester-based unit is not especially limited, but a (meth)acrylate alkyl ester is preferably used. In concrete, methyl (meth)acrylate, ethyl (meth)acrylate, n-propyl (meth)acrylate, n-butyl (meth)acrylate, t-butyl (meth)acrylate, n-hexyl (meth)acrylate, 2-ethyl hexyl (meth)acrylate, cyclohexyl (meth)acrylate, stearyl (meth)acrylate, octadecyl(meth)acrylate, phenyl (meth)acrylate, benzyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, aminoethyl acrylate, propyl aminoethyl acrylate, dimethyl aminoethyl methacrylate, ethyl aminopropyl methacrylate, phenyl aminoethyl methacrylate or cyclohexyl aminoethyl methacrylate, etc., are mentioned and from the view point that an improvement in impact resistance is large, methyl(meth)acrylate is preferably used. These units can be used singly or 2 kinds or more together.

Furthermore, the above-mentioned glycidyl group containing vinyl-based unit is not especially limited, and glycidyl (meth)acrylate, glycidyl itaconate, digrycidyl itaconate, allyl glycidyl ether, styrene 4-grycidyl ether or 4-grycidyl styrene, etc., are mentioned and from the view point that an effect of improving impact resistance is large, glycidyl(meth)acrylate is preferably used. These units can be used singly or 2 kinds or more together.

As the above-mentioned unsaturated dicarboxylic acid anhydride-based unit, maleic anhydride, itaconic anhydride, glutaconic anhydride, citraconic anhydride or aconitic anhydride, etc. can be used and from the view point that an effect of improving impact resistance is large, maleic anhydride is preferably used. These units can be used singly or 2 kinds or more together.

Furthermore, as the above-mentioned aliphatic vinyl-based unit, ethylene, propylene, butadiene or the like, as the aromatic vinyl-based unit, styrene, α-methyl styrene, 1-vinyl naphthalene, 4-methyl styrene, 4-propyl styrene, 4-cyclohexyl styrene, 4-dodecyl styrene, 2-ethyl 4-benzyl styrene, 4-(phenyl butyl)styrene, halogenated styrene or the like, as the cyanided vinyl-based unit, acrylonitrile, methacrylonitrile, ethacrylonitrile or the like, as the maleimide-based unit, maleimide, N-methyl maleimide, N-ethyl maleimide, N-propyl maleimide, N-isopropyl maleimide, N-cyclohexyl maleimide, N-phenyl maleimide, N-(p-bromophenyl) maleimide, N-(chlorophenyl) maleimide or the like, as the unsaturated dicarboxylic acid-based unit, maleic acid, maleic acid monoethyl ester, itaconic acid, phthalic acid or the like, as the other vinyl-based unit, acrylamide, methacrylamide, N-methyl acrylamide, butoxymethyl acrylamide, N-propyl methacrylamide, N-vinyl diethyl amine, N-acetyl vinyl amine, allyl amine, methallyl amine, N-methyl allyl amine, p-aminostyrene, 2-isopropenyl-oxazoline, 2-vinyl-oxazoline, 2-acroyl-oxazoline, 2-styryl-oxazoline or the like, can be used and these, units can be used singly or 2 kinds or more together.

The kind of outermost layer of the multilayer structure organic fine particle is not especially limited, and it can be constituted with a polymer containing unsaturated carboxylic acid alkyl ester-based unit, glycidyl group containing vinyl-based unit, aliphatic vinyl-based unit, aromatic vinyl-based unit, cyanided vinyl-based unit, maleimide-based unit, unsaturated dicarboxylic acid-based unit, unsaturated dicarboxylic acid anhydride-based unit and/or other vinyl-based unit, etc., and from the view point of excellence of transparency and impact resistance, it is preferable to be constituted with a polymer containing methyl methacrylate unit and/or methyl acrylate unit.

An average primary particle diameter of the multilayer structure organic fine particle is not especially limited, but from the view point that transparency and impact resistance are excellent, it is preferable to be 10 to 10,000 nm, furthermore, to be 20 to 1,000 nm is more preferable, to be 50 to 700 nm is especially preferable and to be 100 to 500 nm is most preferable. The above-mentioned average primary particle diameter is a number average primary particle diameter observed at a magnification of 20,000 times by using an electron microscope and primary particle diameters for arbitrarily selected 100 particles were measured and averaged, in concrete, it can be determined by observing dispersion morphology of the multilayer structure polymer in the resin composition by an electron microscope.

As the multilayer structure organic fine particle which satisfy the above-mentioned requirements, commercially available one may be used or it can also be prepared by known methods.

As a commercially available one, for example, Methablen (trademark) produced by Mitsubishi Rayon Co., Kane Ace (trademark) produced by Kaneka Corp, Paraloyd (trademark) produced by Rohm & Haas Co., Stafiloid (trademark) produced by Ganz Chemical Co. or Paraface (trademark) produced by Kuraray Co. etc., can be used and these can be used singly or 2 kinds or more together.

As the above-mentioned known method for preparing the multilayer structure organic fine particle, emulsion polymerization method is more preferably employed. That is, at first, a predetermined monomer mixture is emulsion polymerized to prepare a core particle, and then other monomer mixture is emulsion polymerized under presence of the core particle to form a shell layer around the core particle to thereby prepare a core-shell particle. Furthermore, under presence of the particle, other monomer mixture is emulsion polymerized to prepare a core-shell particle having a separate shell layer formed. By repeating such reactions, a multilayer structure polymer constituted with the predetermined core layer and 1 or more shell layers covering thereon is obtained. Regarding the polymerization temperature for forming (co)polymer of each layer, 0 to 120° C. is preferable for each layer, and 5 to 90° C. is more preferable.

An emulsifier used in the emulsion polymerization is not especially limited, but it is selected depending on polymerization stability and a predetermined average primary particle diameter, etc., and it is preferable to use known emulsifiers such as an anionic surfactant, a cationic surfactant or nonionic surfactant singly or 2 kinds or more and anion surfactant is more preferable. As such anion surfactants, for example, carboxylic acid salts such as sodium stearate, sodium myristate or sodium N-lauroyl sarcocinate, sulfonic acid salts such as sodium dioctyl sulfosuccinate or sodium dodecyl benzene sulfonate, sulfuric ester salts such as sodium lauryl sulfate, phosphoric acid esters such as sodium mono-n-butyl phenyl pentaoxyethylene phosphate, etc., can be used. It is preferable that an amount of the above-mentioned emulsifier to be added is 0.01 to 15 wt parts with respect to 100 wt part of total monomer used.

Furthermore, a polymerization initiator used in the emulsion polymerization is not especially limited, but inorganic peroxides such as potassium persulfate or ammonium persulfate, water soluble redox type initiators such as hydrogen peroxide-ferrous salt system, potassium persulfate-sodium hydrogen sulfite system or ammonium persulfate-sodium hydrogen sulfite system, water soluble-oil soluble redox type initiator such as cumene hydroperoxide-sodium formaldehyde sulfoxylate system or tert-butyl hydroperoxide-sodium formaldehyde sulfoxylate system can be used, and among them, inorganic peroxide-based initiator or water soluble-oil soluble redox type initiator is preferably used. It is preferable that an amount of the above-mentioned polymerization initiator to be added is 0.001 to 5 wt parts with respect to 100 wt parts of total monomer used.

From the view point that transparency of the sheet is excellent, a refractive index of the multilayer structure organic fine particle is preferable to be 1.440 to 1.500, to be 1.445 to 1.495 is more preferable and to be 1.450 to 1.490 is especially preferable.

In addition, it is preferable that the above-mentioned impact resistance improvers are those from which substantially no anion is detected, from the view point of stability of other resin.

It is preferable that a glass transition temperature of the above-mentioned impact resistance improver is −20° C. or less and to be −30° C. or less is more preferable.

It is mentioned above that it is necessary that the polylactic acid-based resin laminate sheet has Layer A and Layer B of polylactic acid-based resin compositions containing poly (meth)acrylate-based resin, and it is a polylactic acid-based resin laminate sheet of which Layer A and Layer B satisfy the equation, $0<Xa<Xb$.

Furthermore, it is also mentioned above that, in the polylactic acid-based resin laminate sheet, by containing an impact resistance improver, it is possible to improve impact resistance of the sheet or a molded product made thereof, as mentioned above.

Furthermore, while satisfying these requirements, in the polylactic acid-based resin laminate sheet, it is preferable that the polylactic acid-based resin composition constituting at least the Layer B contains a poly(meth)acrylate-based resin and an impact resistance improver in the polylactic acid-based resin, and the sheet satisfy an equation, 0<Xaa<Xbb, since it is possible to make heat resistance, impact resistance and biobased content of the sheet higher, wherein, Xaa: total containing ratio (wt %) of poly(meth)acrylate-based resin and impact resistance improver with respect to whole polylactic acid-based resin composition constituting Layer A Xbb: total containing ratio (wt %) of poly(meth)acrylate-based resin and impact resistance improver with respect to whole polylactic acid-based resin composition constituting Layer B.

It is further preferable to be 0<2Xaa<Xbb, especially preferable to be 0<3Xaa<Xbb. In cases where Xaa and Xbb do not satisfy the above-mentioned relation equation, some of heat resistance, impact resistance, and biobased content of the sheet may not be satisfied, i.e., if poly(meth)acrylate-based resin and impact resistance improver are compounded in all layers in a same ratio to impart predetermined heat resistance, biobased content decreases.

When Xa and Xb satisfy the above-mentioned equation, and further, Xaa and Xbb satisfy the above-mentioned relation equation, it is also preferable from the view point of collectibility at producing the polylactic acid-based resin laminate sheet. That is, in an actual production, edge portions of sheet, or sheets which could not be sold are collected, pelletized and recycled in most cases. At that time, if Xa and Xb satisfy the above-mentioned relation equation, collected materials of sheet of layer structure B/A/B can be used as a raw material of Layer A by diluting it, for example.

Regarding the impact resistance improver contained in the polylactic acid-based resin laminate sheet, it is preferable that a containing ratio of the impact resistance improver with respect to whole resin composition constituting each layer is 0.1 to 40 wt %, more preferably 0.2 to 30 wt %, especially preferably 0.5 to 20 wt %. When the containing ratio of the impact resistance improver is less than 0.1 wt %, improving effect of impact resistance of the sheet may lower, and on the contrary, when it exceeds 40 wt %, heat resistance and transparency of the sheet may lower.

The impact resistance improver contained in the polylactic acid-based resin laminate sheet may be contained in any layer of Layer A and/or the Layer B and/or a third Layer C other than the Layer A and Layer B. However, it is preferable to be contained 0.1 to 30 wt % in Layer A, and 0.2 to 40 wt % in Layer B. Regarding the containing ratio in Layer A, 0.2 to 25 wt % is more preferable and 0.5 to 20 wt % is especially preferable. Regarding the containing ratio in Layer B, 0.5 to 35 wt % is more preferable and 1 to 30 wt % is especially preferable.

As a method of measuring precise amount of each resin contained in the polylactic acid-based resin laminate sheet, a measuring method by NMR is mentioned. For example, resin of a specified layer constituting the sheet is subjected to $^1H$ nucleus-NMR measurement in deuterium chloroform solvent at 55° C., and from an intensity ratio of a peak of sample and a peak based on polylactic acid (for example, peak based on methane group) and a peak based on polymethyl methacrylate (for example, peak based on methoxy group), compounding ratios of polylactic acid and polymethyl methacrylate are calculated, and the remainder is considered as impact resistance improver. When it is impossible to calculate due to an overlapping of the peaks of $^1H$ nucleus, it is possible to calculate by further subjecting to $^{13}C$ nucleus measurement.

In the polylactic acid-based resin laminate sheet, it is preferable that all layers constituting the sheet satisfy the following condition:

$$|xn_p+(100-x)n_q-100n_r|<4$$

x: compounding ratio (wt %) of polylactic acid-based resin with respect to 100 wt % of polylactic acid-based resin and poly(meth)acrylate-based resin in total $n_p$: refractive index of the polylactic acid-based resin $n_q$: refractive index of the poly(meth)acrylate-based resin $n_r$: refractive index of the impact resistance improver.

It is preferable to be, $$|xn_p+(100-x)n_q-100n_r|<3$$

more preferably, $$|xn_p+(100-x)n_q-100n_r|<2$$

especially preferably, $$|xn_p+(100-x)n_q-100n_r|<1.$$

The above-mentioned equation indicates that the absolute value of difference between the refractive index ($xn_p+(100-x)n_q$) of the base resin phase comprising the polylactic acid resin and poly(meth)acrylate-based resin and the refractive index of the impact resistance improver ($100n_r$) is a constant value or less (both of the refractive index ($xn_p+(100-x)n_q$) of the base resin phase and the refractive index of the impact resistance improver ($100n_r$) are 100 times of actual refractive index value). In the case where a plurality of polylactic acid resin and poly(meth)acrylate-based resin are contained in a specified layer, since the refractive index ($xn_p+(100-x)n_q$) of the base resin phase of the above-mentioned equation follows the additivity rule, it may be calculated by multiplying respective compounding ratios. On the other hand, in the case where a plurality of the impact resistance improvers are contained in a specified layer, it is preferable that the above-mentioned equation is satisfied for all of the impact resistance improvers contained therein.

In cases where $n_p$, $n_q$, $n_r$ do not satisfy the above-mentioned relation equation, transparency of the sheet may deteriorate. This indicates that, when the difference between the refractive index of the base resin phase comprising the polylactic acid resin and poly(meth)acrylate-based resin and the refractive index of the impact resistance improver is large, the sheet may become turbid.

It is preferable that the impact resistance improver forms a dispersed phase in the resin composition.

From the view point that transparency, heat resistance and impact resistance are excellent, it is preferable that dispersed particle diameter of the impact resistance improver in the resin composition is 1 to 1,000 nm, to be 50 to 750 nm is more preferable and to be 100 to 500 nm is especially preferable. The dispersed particle diameter is that, observed at a magnification of 20,000 times by using an electron microscope, dispersed particle diameters are measured for 100 particles arbitrarily selected and averaged to obtain a number average dispersed particle diameter. The dispersed particle is the total value of number of aggregated particles (X) obtained by the following evaluation criteria and a number of particles (Y) which are not aggregated.

From the view point that transparency, heat resistance and impact resistance are excellent, it is preferable that ratio (X/Y) of the number of aggregated particles (X) and the number of particles which are not aggregated (Y) of the impact resistance improver in the resin composition is 0 to 0.5, and to be 0 to 0.2 is more preferable. The number of aggregated particles and the number of particles which are not aggregated were, by using an electron microscope, observed at a magnification of 20,000 timed, for 100 particles of the dispersed particles of the impact resistance improver, a case where the dispersed particles contact was evaluated as aggregated particles. In addition, X denotes, total number of dispersed particles involved in aggregation, i.e., for example, in a case where 3 dispersed particles aggregate to form one aggregation, it is calculated that X=3.

Respective thickness ratios of the above-mentioned Layer A and Layer B with respect to the whole thickness of the polylactic acid-based resin laminate sheet are not especially limited, but, to make the effects of both layers effective and to make heat resistance, impact resistance and biobased content compatible, it is preferable to be 10 to 90%. It is more preferable that the respective ratios of Layer A and Layer B are 15 to 85%, respectively, and especially, they are 20 to 80%.

In the polylactic acid-based resin laminate sheet, it is preferable that the total thickness of Layer B is 50 to 400 μm. It is more preferably 80 to 300 μm, further preferably 100 to 200 μm. When the total thickness of Layer B is less than 50 μm, heat resistance may be insufficient. When the total thickness of Layer B exceeds 400 μm, biobased content and moldability of the sheet may become incompatible.

Laminate constitution of the polylactic acid-based resin, laminate sheet is not especially limited. That is, it may be 2 layers of Layer A and Layer B or it may be 3 layers of A/B/A or B/A/B, or it may be a multi-layer constitution other than that. It may contain other third layer than Layer A and Layer B. Among them, from the view point of releasability and demoldability at molding, it is preferable that Layer B is positioned as outermost layer and it is preferable that the outermost layers are same kind of layer to prevent a curl of the sheet due to a difference of heat shrinkages. Accordingly, most preferred is a 3 layers constitution of B/A/B.

In the polylactic acid-based resin composition, it is also possible to mix a solution in which respective components are dissolved in a solvent and then, to produce a composition by removing the solvent, but it is preferable to be a production method employing a melt mixing method which is a practical production method in which, steps for dissolution of starting materials into a solvent and removal of the solvent are not necessary, i.e., the composition is produced by melt mixing the respective components. The melt mixing method is not especially limited and known mixers ordinarily used such as kneader, roll mill, banbury mixer, single or twin-screw extruder can be used. Among them, from the view point of productivity, using single or twin-screw extruder is preferable. The order of mixing is not especially limited, for example, a method of feeding to a melt mixer after the polylactic acid-based resin and the poly(meth)acrylate-based resin are dry blended or a method of, after a master batch is prepared in which the polylactic acid-based resin and the poly(meth)acrylate-based resin are melt mixed beforehand, melt mixing the master batch and the polylactic acid-based resin, or the like can be employed. As required, a method of melt mixing other additives simultaneously, or a method in which the polylactic acid-based resin and other additives are melt mixed to prepare a master batch beforehand, and then, the master batch, the polylactic acid-based resin and the poly (meth) acrylate-based resin are melt mixed, may be employed. In addition, it is preferable that a temperature at the melt mixing is in the range of 190° C. to 250° C., and to prevent deterioration of the polylactic acid, it is more preferable to be in the range of 200° C. to 240° C.

In the polylactic acid-based resin laminate sheet, it is preferable that a melt viscosity Va(Pa·s) of the resin constituting Layer A and a melt viscosity Vb (Pa·s) of the resin constituting Layer B at a temperature of 220° C. and at a shear rate of 100 sec$^{-1}$ satisfy the following conditions:

$$500 < Va < 1500$$

$$500 < Vb < 1500,$$

$$|Va - Vb| < 700$$

and it is more preferable to satisfy the following conditions, $$550 < Va < 1300$$

$$550 < Vb < 1300,$$

$$|Va - Vb| < 600$$

and it is especially preferable to satisfy the following conditions, $$600 < Va < 1200$$

$$600 < Vb < 1200,$$

$$|Va - Vb| < 500.$$

That is, when the above-mentioned Va or Vb exceeds 1500, a melt extrusion at a higher temperature becomes necessary, and the polylactic acid-based resin may deteriorate. On the other hand, in cases where the above-mentioned Va or Vb is less than 500, impact resistance or heat resistance of the sheet may be insufficient. When the above-mentioned |Va−Vb| exceeds 700, viscosity unevenness is generated to the sheet at film forming by melt extrusion, and laminate precision may deteriorate or a laminate film forming may become impossible.

The polylactic acid-based resin composition has in some cases, depending on a kind, an amount to be compounded or a mixing method of the poly(meth)acrylate-based resin, a structural period of 3 μm or less, and this case is preferable since an excellent mechanical characteristics and heat resistance are compatible. This structural period is originated in some cases from a micro phase separation structure formed by spinodal decomposition after once being compatibilized at the time of melt mixing, but it is not limited thereto. To confirm the "micro phase separation structure," for example, methods of observation such as by an optical microscope or a transmission electron microscope are mentioned. Regarding the "structural period," in a scattering measurement carried out by using a light scattering instrument or a small angle X-ray scattering instrument, it can be confirmed such as by appearing a scattering maximum. Since light scattering instrument and small angle X-ray scattering instrument are different in best suitable measuring region, they are used by being appropriately selected depending on size of the structural period. The presence of the scattering maximum in this scattering measurement is a proof of having a regular phase separation structure of a certain period, and the value of structural period Λm can be calculated by the following equation by using wavelength λ, of the scattered light in scattering medium and scattering angle θm which gives the scattering maximum:

$$\Lambda m = (\lambda/2)/\sin(\theta m/2).$$

Furthermore, the polylactic acid-based resin composition may be compatibilized depending on a kind, a compounding ratio or a mixing method of the poly(meth)acrylate to be compounded, and in that case, especially, since heat resistance and transparency are excellent, it is preferable since it can be suitably used in various applications which require transparency. The "be compatibilized" means that both components are mixed uniformly in molecular level, and when the above-mentioned structural period is measured for a compatibilized polylactic acid-based resin composition, it is at most 0.01 μm or less, and that case is preferable since heat resistance and transparency are especially excellent.

In Layer A and/or Layer B of the polylactic acid-based resin laminate sheet, in a desired range, as required, other resins than the polylactic acid-based resin and poly(meth) acrylate-based resin may be mixed. For example, thermoplastic resins such as polyacetal, polyethylene, polypropylene, polyamide, polyphehylene sulfide resin, polyether ether ketone resin, polyester, polysulfone, polyphenylene oxide, polyimide, polyether imide, polyvinyl compound, thermosetting resins such as phenol resin, melamine resin, polyester resin, silicone, resin, epoxy resin, flexible thermoplastic resins such as ethylene/glycidyl methacrylate copolymer, polyester elastomer, polyamide elastomer, ethylene/propylene terpolymer, ethylene/butene-1copolymer, can be used.

Among them, especially, polyvinyl resin of which glass transition temperature is 60° C. or more is preferable since it has an effect of improving heat resistance of the polylactic acid-based resin composition. As concrete examples of the polyvinyl resin of which glass transition temperature is 60° C. or more are, various styrene-based polymers such as polystyrene, poly (4-acetyl styrene), poly(2-methyl styrene), poly(3-methyl styrene), poly(4-methyl styrene), poly (4-methoxy styrene), poly(4-hydroxystyrene) (polyvinyl phenol), poly(2-hydroxymethyl styrene), poly(3-hydroxymethyl styrene) or poly(4-hydroxymethyl styrene), and various polyvinyl esters such as poly(benzoyl oxyethylene), poly(cyclohexanoyl oxyethylene), poly(4-ethoxybenzoyl oxyethylene), poly(2-methoxy benzoyl oxyethylene), poly(4-methoxy benzoyl oxyethylene) or poly(4-phenyl benzoyl oxyethylene), etc., can be used, but among them, it is preferable to use poly(4-hydroxystyrene) (polyvinyl phenol) from the view point of compatibility with the polylactic acid-based resin.

A transparent nucleating agent may be added to Layer A and/or Layer B of the polylactic acid-based resin laminate sheet for the purpose of preventing whitening at high temperature and for the purpose of further improve heat resistance. That is, by accelerating micro-crystallization by including the crystal nucleating agent in the polylactic acid-based resin, whitening due to an excessive growth of crystal can be prevented and by the crystallization, heat resistance temperature can be raised. It is preferable that the transparent nucleating agent has a good compatibility with the polylactic acid-based resin and it is preferable that the nucleating agent raises crystallization rate and, when crystallized, maintains the transparency of the resin. As such transparent nucleating agents, an aliphatic carboxylic acid amide, an aliphatic carboxylic acid salt, an aliphatic alcohol, an aliphatic carboxylic acid ester, an aliphatic/aromatic carboxylic acid hydrazide, a melamine-based compound, a phenyl phosphonic acid metal salt and a sorbitol-based compound can be used but it is not limited thereto.

As concrete examples of the aliphatic carboxylic acid amide, aliphatic monocarboxylic acid amides such as lauric acid amide, palmitic acid amide, oleic acid amide, stearic acid amide, erucic acid amide, behenic acid amide, ricinoleic acid amide or hydroxystearic acid amide, N-substituted aliphatic monocarboxylic acid amides such as N-oleyl palmitic acid amide, N-oleyl oleic acid amide, N-oleyl stearic acid amide, N-stearyl oleic acid amide, N-stearyl stearic acid amide, N-stearyl erucic acid amide, methylol stearic acid amide or methylol behenic acid amide, aliphatic biscarboxylic acid amides such as methylene bisstearic acid amide, ethylene bislauric acid amide, ethylene biscapric acid amide, ethylene bisoleic acid amide, ethylene bisstearic acid amide, ethylene biserucic acid amide, ethylene bisbehenic acid amide, ethylene bisisostearic acid amide, ethylene bishydroxystearic acid amide, butylene bisstearic acid amide, hexamethylene bisoleic acid amide, hexamethylene bisstearic acid amide, hexamethylene bisbehenic acid amide, hexamethylene bishydroxystearic acid amide, m-xylylene bisstearic acid amide, m-xylylene bis-12-hydroxystearic acid amide, N-substituted aliphatic carboxylic acid bisamides such as N,N'-dioleyl sebacic acid amide, N,N'-dioleyl adipic acid amide, N,N'-distearyl adipic acid amide, N,N'-distearyl sebacic acid amide, N,N'-distearyl isophthalic acid amide or N,N'-distearyl terephthalic acid amide, N-substituted ureas such as N-butyl N'-stearyl urea, N-propyl-N'-stearyl urea, N-stearyl N'-stearyl urea, N-phenyl N'-stearyl urea, xylylene bisstearyl urea, toluylene bisstearyl urea, hexamethylene bisstearyl urea, diphenyl methane bisstearyl urea or diphenyl methane bislauryl urea, or the like can be used. These may be one kind or a mixture of 2 kinds or more. Among them, aliphatic monocarboxylic acid amides, N-substituted aliphatic monocarboxylic acid amides or aliphatic biscarboxylic acid amides are preferably used, and especially preferably, palmitic acid amide, stearic acid amide, erucic acid amide, behenic acid amide, ricinoleic acid amide, hydroxystearic acid amide, N-oleyl palmitic acid amide, N-stearyl erucic acid amide, ethylene biscapric acid amide, ethylene bisoleic acid amide, ethylene bislauric acid amide, ethylene biserucic acid amide, m-xylylene bisstearic acid amide and m-xylylene bis-12-hydroxystearic acid amide are preferably used.

Furthermore, as concrete examples of the aliphatic carboxylic acid salt, lauric acid salts such as sodium laurate, potassium laurate, potassium hydrogen laurate, magnesium laurate, calcium laurate, zinc laurate or silver laurate, myristic acid salts such as lithium myristate, sodium myristate, potassium hydrogen myristate, magnesium myristate, calcium myristate, zinc myristate or silver myristate, palmitic acid salts such as lithium palmitate, potassium palmitate, magnesium palmitate, calcium palmitate, zinc palmitate, copper palmitate, lead palmitate, thallium palmitate or cobalt palmitate, oleic acid salts such as sodium oleate, potassium oleate, magnesium oleate, calcium oleate, zinc oleate, lead oleate, thallium oleate, copper oleate or nickel oleate, stearic acid salts such as sodium stearate, lithium stearate, magnesium stearate, calcium stearate, barium stearate, aluminum stearate, thallium stearate, lead stearate, nickel stearate or beryllium stearate, isostearic acid salts such as sodium isostearate, potassium isostearate, magnesium isostearate, calcium isostearate, barium isostearate, aluminum isostearate, zinc isostearate or nickel isostearate, behenic acid salts such as sodium behenate, potassium behenate, magnesium behenate, calcium behenate, barium behenate, aluminum behenate, zinc behenate or nickel behenate, montanic acid salts such as sodium montanate, potassium montanate, magnesium montanate, calcium montanate, barium montanate, aluminum montanate, zinc montanate or nickel montanate, etc., can be used. These may be one kind or a mixture of two kinds or more. In particular, stearic acid salts or montanic acid salts are preferably used, especially preferably, sodium stearate, potassium stearate, zinc stearate or calcium montanate are preferably used.

In addition, as concrete examples of the aliphatic alcohol, aliphatic monoalcohols such as pentadecyl alcohol, cetyl alcohol, heptadecyl alcohol, stearyl alcohol, nonadecyl alcohol, eicosyl alcohol, ceryl alcohol or melissyl alcohol, aliphatic polyvalent alcohols such as 1,6-hexane diol, 1,7-heptane diol, 1,8-octane diol, 1,9-nonane diol or 1,10-decane diol, cyclic alcohols such as cyclopentane1,2-diol, cyclohexane1,2-diol or cyclohexane1,4-diol, etc., can be used. These may be one kind or a mixture of 2 kinds or more. Among them, aliphatic mono-alcohols are preferably used, and especially preferably, stearyl alcohol is preferably used.

In addition, as concrete examples of the aliphatic carboxylic acid ester, aliphatic monocarboxylic acid esters such as lauric acid cetyl ester, lauric acid phenacyl ester, myristic acid cetyl ester, myristic acid phenacyl ester, palmitic acid isopropylidene ester, palmitic acid dodecyl ester, palmitic acid tetradodecyl ester, palmitic acid pentadecyl ester, palmitic acid octadecyl ester, palmitic acid cetyl ester, palmitic acid phenyl ester, palmitic acid phenacyl ester, stearic acid cetyl ester or behenic acid ethyl ester, monoesters of ethylene glycol such as glycol monolaurate, glycol monopalmitate or glycol monostearate, diesters of ethylene glycol such as glycol dilaurate, glycol dipalmitate or glycol distearate, monoesters of glycerin such as glycerin monolaurate, glycerin monomyristate, glycerin monopalmitate or monostearate, diesters of glycerin such as glycerin dilaurate, glycerin dimylistate, glycerin dipalmitate or glycerin distearate, triesters of glycerin such as glycerin trilaurate, glycerin trimyristate, glycerin tripalmitate, glycerin tristearate, palmitodiolein, palmitodistearin or oleodistearin, etc., can be used. These may be one kind or a mixture of 2 kinds or more. Among them, diesters of ethylene glycol are preferable, and especially preferably, ethylene glycol distearate is preferably used.

In addition, as concrete example of the aliphatic/aromatic carboxylic acid hydrazide, sebacic acid dibenzoic acid hydrazide, and as concrete examples of melamine-based compound, melamine cyanurate or melamine polyphosphate, and as concrete examples of phenyl phosphonic acid metal salt, phenyl phosphonic acid zinc salt, phenyl phosphonic acid calcium salt, phenyl phosphonic acid magnesium salt or phenyl phosphonic acid magnesium salt, as concrete examples of sorbitol-based compound, bis(p-ethyl benzylidene) sorbitol or bis(4-methyl benzylidene) sorbitol, etc., can be used.

These transparent nucleating agents can be used one kind singly, or 2 kinds or more together.

A concrete adding amount of the transparent nucleating agent is, with respect to the whole polylactic acid-based resin composition constituting the respective layers, preferably 0.1 to 5 wt %, more preferably 0.1 to 2.5 wt %, still more preferably 0.3 to 2 wt %, especially preferably 0.5 to 1.5 wt %. When the adding amount is smaller than 0.1 wt %, its effect as transparent nucleating agent becomes insufficient, and it may become difficult to prevent whitening at high temperature or heat resistance may decrease. When the adding amount is larger than 5 wt %, not only transparency may deteriorate, but also appearance or physical characteristics may change.

To the polylactic acid-based resin laminate sheet, various particles can be contained. Its average particle diameter is 0.01 to 10 μm, and its adding amount is, with respect to 100 wt parts of the polylactic acid-based resin, preferably 0.01 to 10 wt parts. The average particle diameter is, more preferably, 0.02 to 5 μm and further preferably 0.03 to 2 μm. The above-mentioned adding amount is, more preferably, 0.02 to 1 wt parts and further preferably 0.03 to 0.5 wt parts. That is, when the above-mentioned average particle diameter is smaller than 0.01 μm, or when the above-mentioned adding amount is smaller than 0.01 wt parts, effect of the particle addition is unlikely to appear, for example, there is an inclination that the effects such as improving moldability or releasability from the mold by improving slipperiness between mold and film is unlikely to appear, and on the other hand, when the above-mentioned average particle diameter is larger than 10 μm, or when the above-mentioned adding amount is larger than 10 wt parts, transparency of the sheet may deteriorate.

A kind of particle is appropriately selected according to its purpose or application, and it is not especially limited, but an inorganic particle, an organic particle, a cross-linked polymer particle or an internal particle generated in polymerization system, etc., can be used. As a matter of course, each particle may respectively be used singly, or may be used as a mixture. When they are used as a mixture, it is preferable that the respective particles are in the above-mentioned average particle diameter, and it is preferable that the total content of all kinds of particle is in the above-mentioned range.

The inorganic particle is not especially limited, but fine particle of silicon oxide such as silica, various carbonic acid salts such as calcium carbonate, magnesium carbonate or barium carbonate, various sulfuric acid salts such as calcium sulfate or barium sulfate, various composite oxides such as kaolin or talc, various phosphoric acid salts such as lithium phosphate, calcium phosphate or magnesium phosphate, various oxides such as aluminum oxide, titanium oxide or zirconium oxide and various salts such as lithium fluoride, etc., can be used.

Furthermore, as the organic particle, fine particles of calcium oxalate or terephthalic acid salts such as of calcium, barium, zinc, manganese or magnesium, are used. As the cross-linked polymer particle, fine particles composed of homopolymer or copolymer of vinyl-based monomers of divinyl benzene, styrene, acrylate or methacrylate can be used. Other than that, organic fine particles such as of polytetrafluoroethylene, benzoguanamine resin, thermosetting epoxy resin, unsaturated polyester resin, thermosetting urea resin or thermosetting phenol resin are preferably used.

On the other hand, as the internal particle generated in polymerization system, particles generated by known methods in which an alkali metal compound, an alkaline earth metal compound or the like is added to a reaction system and a phosphorus compound is further added, is also used.

Whole thickness of the polylactic acid-based resin laminate sheet can be freely changed depending on its application and is not especially limited, but it is preferably 50 to 2000 μm, more preferably 100 to 1500 μm and especially preferably 200 to 1000 μm. In the case where the film thickness is thinner than 50 μm, not only a film breakage becomes easy to occur to thereby deteriorate moldability, but also, even when it could be molded, a problem may occur such as that strength of molded product decreases. In the case where film thickness is thicker than 2000 μm, a problem may occur that a long time may be necessary for heating before molding, and even when molded well, the product may become brittle.

Furthermore, in the polylactic acid-based resin laminate sheet, in a range in which the effect is not impaired, as required, additives, for example, a flame retardant, a heat stabilizer, a light stabilizer, an antioxidant, an anti-coloring agent, a UV absorber, an anti-static agent, a plasticizer, a tackifier, an organic lubricant such as an aliphatic acid ester or a wax, or a defoamer such as a polysiloxane, a colorant such as a pigment or a dye can be compounded in an appropriate amount.

Furthermore, for the purpose of improving blocking prevention, preventing electrostaticity, imparting releasability from a mold, improving scratch resistance, or the like, it is effective to provide a functional coat layer on, surface of the polylactic acid-based resin laminate sheet. For forming the functional layer, an in-line coating method which is carried out in sheet production step and an off-line coating method which is carried out after sheet winding can be employed.

Concrete methods for forming such a functional layer is not especially limited, but a wire bar coat method, a doctor blade method, a micro-gravure coat method, a gravure roll coat method, a reverse roll coat method, an air knife coat method, a rod coat method, a die coat method, a kiss coat method, a reverse kiss coat method, an impregnation method, a curtain coat method, a spray coat method, an air doctor coat method or other coating devices than these can be employed singly or in combination.

Furthermore, as another method for forming the functional layer, it is also possible to employ means in which a coating liquid containing the functional chemical is coated in stretching step. As such means, a method of coating a coating liquid on an unstretched sheet and biaxially stretching it sequentially or simultaneously, a method of coating the coating liquid on a uniaxially stretched sheet and further stretching it in the direction perpendicular to the uniaxial stretching direction, or after coating the coating liquid on a biaxially oriented sheet and further stretching it, or the like are mentioned.

However, to improve coatability or adhesion of the coating liquid to the sheet, it is possible to subject the sheet to a chemical treatment or a discharge treatment before the coating.

In particular, it is preferable to have a releasing layer on at least one surface of the laminate sheet of the polylactic acid-based resin sheet. The reason is that, the polylactic acid-based resin laminate sheet may be crystallized by heat treatment in a metal mold to make it heat resistant, and at that time, the releasing layer is suitable to improve releasability between the sheet and the mold.

As the materials for the mold releasing layer, known materials can be used and one kind or more selected from long-chain alkyl acrylates, silicone resins, melamine resins, fluororesins, cellulose derivatives, urea resins, polyolefin resins, paraffin-based releasing agents or the like are preferably used.

As the long chain alkyl acrylate used for the releasing layer of the polylactic acid-based resin laminate sheet, copolymerized acrylic resins of an acrylic-based monomer having an alkyl group with 12 to 25 carbons in side chain and a monomer copolymerizable with the acrylic-based monomer can be used, and those of which copolymerization ratio of the alkyl acrylate monomer with an alkyl group having 12 to 25 carbons in side chain in the copolymerized acrylic resin of 35 mass % or more are used. An amount of copolymerization of the monomer in the copolymerized acrylic resin is preferably 35 to 85 mass % and further preferably 60 to 80 mass %, and a case in which these ranges are satisfied is preferable in view of blocking resistance or copolymerization ability.

As such an alkyl acrylate monomer having an alkyl group with 12 to 25 carbons in side chain, when the above-mentioned requirement is satisfied, it is not especially limited, but for example, long chain alkyl group containing acrylic-based monomers such as dodecyl acrylate, tridecyl acrylate, tetradecyl acrylate, pentadecyl acrylate, hexadecyl acrylate, heptadecyl acrylate, octadecyl acrylate, nonadecyl, acrylate, eicosyl acrylate, heneicosyl acrylate, docosyl acrylate, tricosyl acrylate, tetracosyl acrylate, pentacosyl acrylate, dodecyl methacrylate, eicosyl methacrylate or pentacosyl methacrylate, can be used.

In cases where the long chain alkyl acrylate is used as the releasing layer, in consideration of the environment, it is especially preferable to use an aqueous coating material and, for example, as other copolymerizable monomers to make it emulsifiable, the following acrylic-based monomers can be used. As the monomers, methyl acrylate, ethyl acrylate, butyl acrylate, 2-ethoxyethyl acrylate, 2-methoxy ethyl acrylate, 2-butoxyethyl acrylate, methyl methacrylate, ethyl methacrylate, acrylonitrile, methacrylonitrile, vinyl acetate, (meth)acrylate, styrene, itaconic acid, (meth)acrylamide, 2-hydroxyethyl (meth)acrylate, diethylene glycol mono(meth)acrylate, N-methylol (meth)acrylamide, dimethyl aminoethyl (meth)acrylate, diethyl aminoethyl (meth)acrylate, (meth)acryloyl oxyethyl phosphoric acid ester, sodium vinyl sulfonate, sodium styrene sulfonate, maleic anhydride, etc., can be used.

The silicone resin used as the releasing layer of the polylactic acid-based resin laminate sheet is not especially limited, but, in view of dispersibility and stability, it is preferable to use an emulsion type resin. In concrete, silicone KM-786, KM-787, KM-788, KM-9736, KM-9737, KM-9738, KM-9744, KM-9745, KM-9746, etc., produced by Shin-Etsu Chemical Co. can be used.

In addition, curable silicones can be preferably used and, for example, addition reaction-based ones such as a solvent addition type or a nonsolvent addition type, condensation reaction-based ones such as a solvent condensation type or a nonsolvent condensation type, active energy ray curable type ones such as a solvent UV curable type, a nonsolvent UV curable type or a nonsolvent electron beam curable type, or the like can be used, and these can also be used not only singly but also 2 kinds or more together.

It is preferable that a laminated thickness after drying of the releasing layer of the polylactic acid-based resin laminate sheet is 0.005 to 10 μm, and to be 0.01 to 1 μm is especially preferable. Although it depends on whole thickness of the sheet, in cases where the laminated thickness of the releasing layer after drying is less than 0.005 μm, a uniform coated layer is hardly obtainable and a coating unevenness may occur, and as a result, the releasability may become poor than expected. When the laminated thickness of the mold releasing layer after drying exceeds 10 μm, it is not preferable since the polylactic acid-based resin laminate sheet becomes difficult to be recycled as polyester to thereby worsen recyclability.

Furthermore, in particular, it is preferable that the polylactic acid-based resin laminate sheet has an antistatic layer on at least one surface.

As materials for such an anti-static layer, known materials can be used, but an anti-static agent which has a quaternary ammonium salt in its main chain is preferably used. As other methods, anti-static property can also be imparted by including a copolymer which contains at least one kind of sulfonic acid, sulfonic acid salt, vinyl imidazolium salt, dianyl ammonium chloride, dimethyl ammonium chloride and alkyl ether sulfuric acid ester.

In the coating liquid containing an antistatic resin used in the antistatic layer, to improve fixation (blocking property), water resistance, solvent resistance and mechanical strength, as a cross-linking agent of the coated layer, a methylolated or alkylolated compound such as of urea-based, melamine-based, guanamine-based, acrylic-based, acrylamide-based, polyamide-based, polyurethane-based or polyester-based, an epoxy compound, an aziridine compound, an oxazoline compound, a carbodiimide compound, a block polyisocyanate, a silane coupling agent, a titanium coupling agent, a zircon-aluminate coupling agent, a heat, peroxide or photo-reactive vinyl compound or a photosensitive resin, etc., may be contained.

Furthermore, in the above-mentioned coating liquid, to improve fixation or slipperiness, it is possible to include an inorganic type fine particle, and as the inorganic type fine particle, silica, silica sol, alumina, alumina sol, zirconium sol, kaolin, talc, calcium carbon-ate, titanium oxide, barium salt, carbon black, molybdenum sulfide, antimony oxide sol, etc., may be contained, and furthermore, as required, a defoamer, a coatability improver, a viscosity thickener, an organic type lubricant, an organic type polymer particle, an antioxidant, a UV absorber, a foaming agent, a dye, or the like may be contained.

In addition, in the above-mentioned coating liquid, polymers other than our resins may be contained to improve characteristics of the coating liquid or of the coated layer.

It is preferable that a laminated thickness after drying of the antistatic layer of the polylactic acid-based resin laminate sheet is 0.005 to 10 μm, especially preferably, it is 0.01 to 1 μm. In the case where the laminated thickness after drying is less than 0.005 μm, a uniform coated layer is hardly obtainable and a coating unevenness may occur and, as a result, the antistatic performance may become poorer than expected. When it exceeds 10 μm, transparency may deteriorate.

in the polylactic acid-based resin laminate sheet, from the points of suppressing strength decrease by degradation of the molded product obtainable therefrom and of improving the heat resistance, it is preferable that a concentration of carboxyl group terminal of the laminate sheet is 30 equivalent/$10^3$ kg or less, more preferably 20 equivalent/$10^3$ kg or less and especially preferably 10 equivalent/$10^3$ kg or less. In the case where the concentration of carboxyl group terminal of the polylactic acid-based resin exceeds 30 equivalent/$10^3$ kg, its strength decreases by hydrolysis when the laminate sheet or molded product is used under a high temperature and a high humidity condition or under a contacted condition with hot water, and problems may arise that molded products such as container become brittle and are likely to be broken.

As methods for making the concentration of carboxyl group terminal of the polylactic acid-based resin laminate sheet to 30 equivalent/$10^3$ kg or less, for example, a method by controlling catalyst or thermal history at synthesizing the polylactic acid-based resin, a method of reducing thermal history such as by lowering extruding temperature or by shortening residence time at the time of film-forming of the sheet, or a method of end-capping the carboxyl group terminal by using a reactive type compound, or the like can be employed.

In the method of end-capping the carboxyl group terminal by using the reactive type compound, it is preferable that at least a part of the carboxyl group terminals in the sheet is end-capped, and it is more preferable that all of them are end-capped. As the reactive type compounds, for example, condensation reactive type compounds such as an aliphatic alcohol or an amide compound, or addition reaction type compounds such as a carbodiimide compound, an epoxy compound or an oxazoline compound can be used, but in view of unlikeness of generating excessive side-products at the time of the reaction, the addition reaction type compounds are preferably used.

In the polylactic acid-based resin laminate sheet, it is preferable that an amount of lactide contained in the laminate sheet is 0.5 wt % or less. More preferably it is 0.4 wt % or less, still more preferably 0.3 wt % or less. When the amount of the lactide component contained in the laminate sheet exceeds 0.5 wt %, and when the lactic acid oligomer component which is left in the laminate sheet may precipitate in a powdery state or in a liquid state, it may impair handling property and transparency. It may accelerate hydrolysis of the polylactic acid resin and may aggravate aging characteristics of the sheet. The lactide mentioned here denotes cyclic dimers of lactic acid component which constitutes the polymer of which main component is the above-mentioned polylactic acid, i.e., LL-lactide, DD-lactide or DL(meso)-lactide.

The polylactic acid-based resin laminate sheet may be, mainly in view of aging resistance, a stretched sheet and, in that case, it is preferable to be a biaxially stretched sheet.

The method for obtaining the stretched sheet can be carried out by conventional stretched sheet production methods such as inflation method, simultaneous biaxial stretch method or sequential biaxial stretch method, but because it is easy to control orientation conditions of the sheet of which moldability and heat resistance are compatible and because it is possible to make film-forming speed high, a sequential biaxial stretch method is preferable.

Next, production method of the polylactic acid-based resin laminate sheet is explained concretely.

The polylactic acid-based resin, i.e., the polymer of which main component is polylactic acid, can be obtained in the following method. As the raw materials, lactic acid component, L-lactic acid or D-lactic acid, is made as main component and, hydroxycarboxylic acid, which is other than the above-mentioned lactic acid component, can be used together. A cyclic ester intermediate of hydroxycarboxylic acid, for example, lactide, glycolide or the like can also be used as raw material. Furthermore, dicarboxylic acids or glycols can also be used.

The polymer of which main component is the polylactic acid-based resin can be obtained by a method in which the above-mentioned raw material is directly subjected to a dehydration condensation, or by a method in which the above-mentioned cyclic ester intermediate is subjected to a ring-opening polymerization. For example, in case where it is produced by the direct dehydration condensation, by a method in which lactic acids or lactic acids and hydroxycarboxylic acids are subjected to an azeotropic dehydration condensation preferably under presence of an organic solvent, especially a phenyl ether-based solvent, and especially preferably by a polymerization in which the solvent distilled by the azeotropy is dewatered and the solvent containing substantially no water is returned to the reaction system, a high molecular weight polymer can be obtained.

It is also known that a high molecular weight polymer can also be obtained by subjecting a cyclic ester intermediate such as lactide to a ring-opening polymerization under a reduced pressure and by using a catalyst such as tin octoate. At this time, a polymer of which amount of lactide is small can be obtained by employing a method in which removing conditions of water component or low molecular weight compounds in the organic solvent at heating and refluxing are controlled, by employing a method of suppressing depolymerization reaction by deactivation of catalyst after finishing polymerization reaction, or by employing a method of heat treating the produced polymer, or the like.

Hereafter, preferable production methods in the case of obtaining an unstretched laminate sheet of polylactic acid-based resin is produced and, furthermore, in the case of carrying out a sequential biaxial stretching by a tenter are explained, but the sheet is not limited thereto.

A polylactic acid-based resin and a poly(meth)acrylate-based resin are respectively fed to independent and separated twin screw extruders as Layer A and Layer B in a predetermined ratio by using metering devices suitable for the resin properties. As the twin screw extruders, to feed the polylactic acid-based resin and the poly(meth)acrylate-based resin in undried state, vent type twin screw extruders can be preferably used. The fed polylactic acid-based resin and the poly(meth)acrylate-based resin are molten at 150 to 300° C. depending on their melt viscosities, composited in a die or out of die and, for example by T-die method, from a slit die of a lip clearance of 1 to 3 mm, closely contacted to a cooling cast drum made of a metal by statistically charging it by using a wire electrode of 0.5 mm diameter, to thereby obtain a non-oriented cast sheet.

The preferable range of the surface temperature of the metallic cooling roll is 0 to 30° C., more preferable range is 3 to 25° C., still more preferable range is 5 to 20° C. By adjusting the surface temperature of the metallic cooling roll in this range, a good transparency can be exhibited.

In the case where a stretched sheet is intended, thus obtained non-oriented cast sheet is heated by conveying on hot rolls to a temperature at which longitudinal stretching is carried out. For the heating, an auxiliary heating means such as an infrared heater may also be used together. The preferable range of the stretching temperature is, although it depends on glass transition temperature, 80 to 125° C. and more preferably 85 to 120° C. Thus heated non-oriented sheet is stretched in longitudinal direction of the sheet in one stage or in a multi-stage of 2 stages or more by applying a difference of peripheral speeds between hot rolls. The total stretch ratio is preferably 1.2 to 3.5 times and more preferably 1.5 to 3.0 times.

After thus uniaxially stretched sheet is once cooled, the sheet is grasped at both ends by clips and introduced into a tenter, and stretched in transverse direction. The stretching temperature is preferably 75 to 120° C. and more preferably it is 80 to 115° C. The stretch ratio is preferably 1.2 to 3.5 times and more preferably 1.5 to 3.0 times.

To decrease difference of performance in transverse direction of the sheet, it is preferable to stretch in transverse direction at a temperature lower than the stretch temperature in longitudinal direction by 1 to 15° C.

Furthermore, as required, a longitudinal re-stretching and/or a transverse re-stretching may be carried out.

Next, this stretched sheet can be heat set under tension or, under relaxation in transverse direction. Mainly from the view points of imparting a heat dimensional stability to the sheet, and of decreasing lactide content contained in the sheet by diffusion, preferable heat treatment temperature is 100 to 160° C. and more preferably 120 to 150° C. It is preferable that the heat treatment is carried out in the range of 0.2 to 30 seconds, but it is not especially limited. From the view point of decreasing heat shrinkage in transverse direction, the relaxation ratio is preferably 1 to 8%, more preferably 2 to 5%. It is more preferable that the sheet is once cooled before subjecting to the heat set treatment.

Furthermore, the sheet is cooled to room temperature while, if necessary, being subjected to a relaxation treatment in longitudinal and transverse direction, and wound to obtain an intended laminate sheet of polylactic acid-based resin.

By employing a method such as the above-mentioned, the polylactic acid-based resin laminate sheet can be obtained.

The molded product can be produced, by using the polylactic acid-based resin laminate sheet obtained by the above-mentioned method, by employing various molding methods such as a vacuum molding, a vacuum molding, a plug assist molding, a straight molding, a free drawing molding, a plug and ring molding, a skeleton molding or the like.

As the molded products, for example, various articles such as a film, a bag, a tube, a sheet, a cup, a bottle, a tray or a yarn are mentioned, and there is no limitation in their shape, size, thickness, design, etc.

EXAMPLES

Measurement and Evaluation Methods

Measurements and evaluations shown in the examples were carried out in the conditions shown in the following.

(1) Weight Average Molecular Weight

It is the value of the standard polymethyl methacrylate equivalent weight average molecular weight measured by gel permeation chromatography (GPC) Warters 2690 produced by Japan Waters Co. It was measured by using chloroform as solvent at a flow rate of 0.5 mL/min by injecting 0.1 mL solution of a sample concentration of 1 mg/1 mL, at a column temperature of 40° C.

In the case where a sample is not dissolved in chloroform, other solvent in which a material to be measured is soluble such as hexafluoroisopropanol can be used.

(2) Structural Period of Polylactic Acid-Based Resin Composition

A sheet sample was analyzed by using a light scattering instrument DYNA-3000 produced by Otsuka Electronics Co., and a structural period $\Lambda m$ (μm) is calculated by the following equation:

$$\Lambda m = (2\lambda/2)/\sin(\theta m/2)$$

where, $\lambda$: wavelength of scattered light in scattering medium (μm)

$\theta m$: scattering angle which gives the scattering maximum, where, in the tables, in case where structural period is 0.01 μm or less, it was indicated as "−."

(3) Identification of Resin Composition in Each Layer $^1$H-NMR measurement and $^{13}$C-NMR measurement of the resin of each layer were carried out and contained resins were identified. As required, in the case of a copolymer, hydrolysis, making the decomposed products into derivatives and GC/MS measurement of the derivatives, etc. was carried out, and, in case of an additive, GPC fractions were collected and the collected substances were subjected to $^1$H-NMR measurement and contained resins were identified.

(4) Xa, Xb and Containing Amount of Each Resin in Each Layer

From the $^1$H-NMR chart or the $^{13}$C-NMR chart obtained in (3), it was calculated from strength ratio of peaks of sample and peaks based on each resin.

(5) Flowability of poly(meth)acrylate-Based Resin

The flowability (g/10 min) was measured according to JIS K7210 at 230° C. and 37.3N.

(6) Glass Transition Temperature of Polyester-Based Resin Used as Impact Resistance Improver (R)

As a differential scanning calorimeter, DSC(RDC220) produced by Seiko Instruments Inc., and as a data analyzer, Discstation (SSC/5200) of the same company were used. A sample 5 mg was set in aluminum tray, heated from 25° C. to 240° C. at a temperature raising rate of 20° C./min, and after maintaining it for 5 minutes, it was cooled rapidly to −40° C. by liquid nitrogen, and after maintaining for 5 minutes, heated again up to 240° C. at a temperature raising rate of 20° C./min, and the average value of extrapolated starting temperature of glass transition and extrapolated end temperature of glass transition measured in the second temperature raising step was taken as the glass transition temperature.

(7) Dispersion Diameter in Sheet of Polyester-Based Resin Used as Impact Resistance Improver (R)

A sheet was cut in (i) the direction parallel to longitudinal direction and perpendicular to film surface, (ii) the direction parallel to transverse direction and perpendicular to film surface, (iii) the direction parallel to film surface, to prepare samples in 50 nm thickness by ultra thin section method, and after dyeing as required, the cut surface was observed by using a transmission electron microscope (H-7100FA type produced by Hitachi, Ltd) under a condition of applied voltage of 100 kV, and photographs were taken at a magnification of 40,000 times and the obtained photographs were recorded into an image analyzer as images.

In cases where polyester-based resin is an island component of sea and island components, 100 sections of the island component were arbitrarily selected and subjected to an image processing to determine the size of the island component.

The maximum length in film thickness direction (la) and the maximum length in longitudinal direction (lb) of the island component appeared in the cross-section (i), the maximum length in film thickness direction (lc) and the maximum length in transverse direction (ld) of the island component appeared in the cross-section (ii), the maximum length in film longitudinal direction (le) and maximum length in transverse direction (lf) of the island component, appeared in the cross-section (iii), were determined.

Next, when provided that, shape index $I$ of the island component=(average value of($lb$)+average value of ($le$))/2, shape index $J$=(average value of($ld$)+average value of($lf$))/2 and shape index $K$=(average value of($la$)+average value of($lc$))/2, ($I$+$J$+$K$)/3 is taken as the dispersion diameter.

In the case where the polyester-based resin and other resin formed a multilayer structure in the sheet plane, layer thicknesses of arbitrarily selected 50 points were determined and the average thereof was taken as the dispersion diameter.

In the tables, in the case where the dispersion diameter was less than 0.01 µm, it was indicated as "–."

(8) Melt Viscosity (Va and Vb)

Resins constituting each layer were mixed by a vent type twin screw extruder (screw diameter 30 mm, L/D=45), to prepare a pellet. Melt viscosity value (Pa·s) of the pellet under a shear rate of 100 sec$^{-1}$ was measured by using Flow Tester CFT-500A (die diameter 1 mm, die length 10 mm, cross-sectional area of plunger 1 cm$^2$), produced by Shimazu Corp. at a temperature of 220° C. after pre-heating for 3 minutes.

(9) Refractive Index ($n_p$, $n_q$ and $n_r$) of Resin

Press sheets of approximately 200 µm thickness were prepared by preheating each resin separately for one minute at 200 to 240° C., melt pressing under a condition of 15 kgf/cm$^2$ for one minute and by cooling with water. Refractive indexes of the press sheets were measured by using an Abbe refractometer at 23° C. and at a wavelength of 589 nm, and 3 direction average values of x, y, z directions were calculated. As to x, y and z, an arbitrarily selected direction in the plane direction of the press sheet was defined as x, the 90° direction to x in the same plane was defined as y and 90°, i.e., perpendicular direction to the plane (thickness direction) was defined as z.

(10) Layer Thickness Ratio

A photograph of cross-section of the sheet was taken by transmitted light by using a metallurgical microscope, Leica DMLM, produced by Leica Microsystems Co. at a magnification of 100 times, and measured each layer thickness.

(11) Impact Resistance

For longitudinal and transverse directions of the polylactic acid-based resin laminate sheet, 10 pieces of 20 mm×100 mm strip-shaped sample were prepared, respectively. The total 20 pieces of the strip-shaped samples were slowly folded 180° so that the 100 mm length becomes a half, and depending on sample shape at that time, the impact resistance was determined according to the following criteria:

○ (good): any of 20 samples is not broken (folded)
Δ (fair): 1 or more samples are not broken
x (poor): all 20 samples are broken.

(12) Heat Resistance

A sheet sample of 320 mm width and 460 mm length of the polylactic acid-based resin laminate sheet was molded (sheet temperature 80 to 120° C.) by a small type vacuum molding machine, Forming 300X model, produced by Seiko Sangyo Co., equipped with a dummy can mold for beverage (half column) of 70 mm diameter and 130 mm height, and deformation of cup was evaluated by visual inspection when the obtained molded product was put into a constant temperature bath of respective predetermined temperatures for 2 hours:

○ (good): no deformation at 70° C.
Δ (fair): deformed at 70° C., but not deformed at 65° C.
x (poor): deformed at 65° C.

(13) Biobased Content

From the containing ratio (wt %) of the each resin of the each layer determined by (3) and (4), layer constitution of the each resin of the each layer and the thickness ratio, the containing ratio (biobased content) of the polylactic acid resin with respect to the resin composition of the whole sheet was determined, and the biobased content was determined according to the following criteria:

○ (good): biobased content is 50% or more
Δ (fair): biobased content is 20% or more and less than 50%
x (poor): biobased content is less than 20%.

(14) Transparency

Haze values of the polylactic acid-based resin laminate sheets were measured by using Hazemeter HGM-2DP model (produced by Suga Test Instruments Co.). Measurements were carried out for arbitrarily selected 5 points for one sample and evaluated by the following criteria by using the average value of the 5 points:

◉ (excellent): Haze is less than 10%
○ (good): Haze is 10% or more and less than 20%
Δ (fair): Haze is 20% or more and less than 30%
x (poor): Haze is 30% or more.

Polylactic Acid-Based Resin (P)

The polylactic acid-based resins used in the examples are explained below:

P-1:
Polylactic acid resin of which D-isomer containing ratio is 1 mol %, PMMA equivalent weight average molecular weight is 190,000 and refractive index is 1.450.

P-2:
Polylactic acid resin of which D-isomer containing ratio is 1 mol %, PMMA equivalent weight average molecular weight is 160,000 and refractive index is 1.450.

P-3:
Polylactic acid resin of which D-isomer containing ratio is 5 mol %, PMMA equivalent weight average molecular weight is 190,000 and refractive index is 1.450.

Poly(meth)acrylate-based Resin (Q) and Impact Resistance Improver (R)

The poly(meth)acrylate-based resin (Q) and the impact resistance improver (R) used in the examples are explained below:

Q-1/R-1:
A mixture of a copolymer of methyl methacrylate and methyl acrylate (Q-1, refractive index=1.490) and a core-shell type organic fine particle comprising a copolymer of methyl methacrylate, butyl acrylate and styrene (R-1, refractive index=1.490) (Smipex (trademark) HT50Y produced by Sumitomo Chemical Co., flowability: 14 g/10 min, estimated containing ratio Q-1/R-1(70/30 wt %))

Q-2:
polymethyl methacrylate (Sumipex LG21 produced by Sumitomo Chemical Co., flowability: 21 g/10 min, refractive index=1.490)

Q-3:
polymethyl methacrylate (Sumipex LG35 produced by Sumitomo Chemical Co., flowability: 35 g/10 min, refractive index=1.490)

Q-4:
polymethyl methacrylate ("ACRYPET" MF produced by Mitsubishi Rayon Co., flowability: 14 g/10 min, refractive index=1.490)

Q-5:
polymethyl methacrylate ("ACRYPET" MD produced by Mitsubishi Rayon Co., flowability: 6 g/10 min, refractive index=1.490)

Q-6:
polymethyl methacrylate ("ACRYPET" VH produced by Mitsubishi Rayon Co., flowability: 2 g/10 min, refractive index=1.490).

R-2:
ethylene/glycidyl methacrylate copolymer (Bondfast (trademark) E produced by Sumitomo Chemical Co.)

R-3:
core-shell type elastomer (Methablen (trademark) KS 0205 produced by Mitsubishi Rayon Co.)

R-4:
core-shell type organic fine particle (KaneAce (trademark) FM-33 produced by Kaneka Corp., refractive index=1.477)

R-5:
core-shell type organic fine particle (KaneAce (trademark) M-210 produced by Kaneka Corp., refractive index=1.490)

R-6:
core-shell type organic fine particle (Paraface (trademark) ME-120 produced by Kuraray Co., refractive index=1.468).

R-7:
To 70 wt parts polyethylene glycol of weight average molecular weight 12,000 and 30 wt parts L-lactide, 0.05 wt parts tin octoate were mixed and polymerized in a reaction container equipped with a stirrer in nitrogen atmosphere at 150° C. for 2 hours, and a block copolymer R-8 of polyethylene glycol and polylactic acid having a polylactic acid segment of weight average molecular weight 2,500 was obtained (weight average molecular weight 17,000, Tg≦60° C., biobased content=29%).

R-8:
To 70 wt parts polypropylene glycol of weight average molecular weight 10,000 and 30 wt parts L-lactide, 0.05 wt parts tin octoate were mixed and polymerized in a reaction container equipped with a stirrer in nitrogen atmosphere at 150° C. for 2 hours, and a block copolymer L-2 of polypropylene glycol and polylactic acid having a polylactic acid segment of weight average molecular weight 2,000 was obtained (weight average molecular weight 14,000, Tg≦60° C., biobased content=29%).

R-9:
polybutylene adipate/terephthalate (EnPol (trademark) G8000 produced by IRe Chemical Ltd., Tg=42° C., biobased content=0%).

R-10:
polybutylene succinate/adipate (EnPol (trademark) G4460 produced by IRe Chemical Ltd, Tg≦60° C., biobased content=0%)

Preparation of Polylactic Acid-Based Resin Laminate Sheet

Example 1

As Layer A, polylactic acid (P-1), polymethyl methacrylate (Q-4) and impact resistance improver (R-8) in a ratio of 93:2:5, and as Layer B, polylactic acid (P-1) and polymethyl methacrylate (Q-4) in a ratio of 30:70, were fed to respectively independent and separate vent type twin screw extruders and co-extruded from a T-die of which temperature was adjusted to 230° C., cooled and solidified by closely contacting, by a electrostatic charge system, with a casting drum cooled to 10° C. to thereby prepare an unstretched sheet of which thickness ratio of Layer B:Layer A:Layer B was 1:8:1 and thickness of the whole sheet was 0.5 mm.

Impact resistance of the obtained sheet was good and heat resistance of molded product obtained from the sheet was also good and its biobased content was also high.

Examples 2 to 17, 19 to 35 and Comparative Examples 1 to 7

Examples were carried out in the same way as Example 1 except changing polylactic acid-based resin (P), poly(meth)acrylate-based resin (Q) and impact resistance improver (R) constituting each layer, the layer constitution and the thickness ratio as shown in tables.

Example 18

Polylactic acid (P-1) and polyester-based resin (R-11) were fed, in a ratio of 90:10, to a vent type twin screw extruder, and extruded at a temperature of 220° C. to prepare a master pellet.

As Layer A, polylactic acid (P-1) and the above-mentioned master pellet in a ratio of 90:1.0, and as Layer B, polylactic acid (P-1), mixture of polymethyl methacrylate and an impact resistant improver (Q-1/R-1) and polyester-based resin (R-11) in a ratio of 29:70:1, were fed to respectively independent and separate vent type single screw extruders and co-extruded from a T-die of which temperature was adjusted to 220° C., cooled and solidified by closely contacting, by an electrostatic charge system, with a casting drum cooled to 10° C. to thereby prepare an unstretched sheet of which thickness ratio of Layer B:Layer A:Layer B is 1:8:1 and thickness of the whole sheet is 0.5 mm.

TABLE 1

|  |  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Layer A | Polylactic acid-based resin (P) | kind | P-1 | P-1 | P-1 | P-1 | P-1 | P-2 | P-3 | P-1 | P-1 | P-1 | P-3 |
|  |  | (wt %) | 93 | 98 | 100 | 100 | 90 | 98 | 95 | 88 | 97 | 100 | 99 |
|  | Poly(meth)acrylate-based resin (Q) | kind | Q-4 | Q-4 | — | — | Q-5 | Q-6 | Q-4 | Q-4 | Q-4 | — | — |
|  |  | Xa (wt %) | 2 | 2 | — | — | 10 | 2 | 5 | 2 | 2 | — | — |
|  | Impact resistance improver (R) (polyester-based) | kind | R-7 | — | — | — | — | — | — | R-8 | R-9 | — | R-9 |
|  |  | (wt %) | 5 | — | — | — | — | — | — | 10 | 1 | — | 1 |
| Layer B | Polylactic acid-based resin (P) | kind | P-1 | P-1 | P-1 | P-1 | P-1 | P-2 | P-3 | P-1 | P-1 | P-1 | — |
|  |  | (wt %) | 30 | 30 | 20 | 40 | 45 | 40 | 10 | 30 | 29 | 50 | — |
|  | Poly(meth)acrylate-based resin (Q) | kind | Q-4 | Q-4 | Q-4 | Q-5 | Q-5 | Q-6 | Q-4 | Q-4 | Q-4 | Q-5 | Q-4 |
|  |  | Xb (wt %) | 70 | 70 | 80 | 60 | 55 | 60 | 90 | 70 | 70 | 50 | 100 |
|  | Impact resistance improver (R) (polyester-based) | kind | — | — | — | — | — | — | — | — | R-9 | — | — |
|  |  | (wt %) | — | — | — | — | — | — | — | — | 1 | — | — |
| Layer constitution |  |  | B/A/B | B/A/B | B/A/B | A/B/A | B/A/B | B/A/B | B/A/B | B/A/B | B/A/B | B/A/B | B/A/B |
| Thickness ratio |  |  | 1/8/1 | 1/8/1 | 1/8/1 | 1/8/1 | 3/4/3 | 1/8/1 | 1/8/1 | 1/8/1 | 1/8/1 | 0.5/9/0.5 | 1/8/1 |
| Structural period (μm) |  |  | — | — | — | — | — | 0.2 | — | — | — | — | — |
| Impact resistance |  |  | ○ | Δ | Δ | Δ | Δ | Δ | Δ | ○ | ○ | Δ | ○ |
| Heat resistance |  |  | ○ | ○ | ○ | Δ | Δ | Δ | ○ | ○ | ○ | Δ | ○ |
| Biobased property (biobased content (%) = polylactic acid resin containing amount (wt %)) |  |  | ○ (82) | ○ (84) | ○ (80) | ○ (52) | ○ (63) | ○ (86) | ○ (78) | ○ (79) | ○ (83) | ○ (95) | ○ (79) |

TABLE 2

|  |  |  | Ex. 12 | Ex. 13 | Ex. 14 | Ex. 15 | Ex. 16 | Ex. 17 | Ex. 18 |
|---|---|---|---|---|---|---|---|---|---|
| Layer A | Polylactic acid-based resin (P) | kind | P-1 | P-1 | P-3 | P-1 | P-1 | P-1 | P-1 |
|  |  | (wt %) | 94 | 99 | 84 | 99 | 99 | 74 | 99 |
|  | Poly(meth)acrylate-based resin (Q) | kind | Q-1 | — | Q-1 | — | — | Q-3 | — |
|  |  | Xa(wt %) | 3.5 | | 10.5 | | | 15 | |
|  | Impact resistance improver (R) | kind | R-1 | — | R-1 | — | — | R-3 | — |
|  |  | (wt %) | 1.5 | | 4.5 | | | 10 | |
|  | Impact resistance improver (R) (polyester-based) | kind | R-10 | R-10 | R-10 | R-10 | R-10 | R-10 | R-10 |
|  |  | (wt %) | 1 | 1 | 1 | 1 | 1 | 1 | 1 |
|  | Melt viscosity Va | (Pa·s) | 800 | 750 | 850 | 750 | 750 | 950 | 750 |
| Layer B | Polylactic acid-based resin (P) | kind | P-1 | P-1 | P-3 | P-1 | P-1 | P-1 | P-1 |
|  |  | (wt %) | 29 | 29 | 29 | 29 | 29 | 29 | 29 |
|  | Poly(meth)acrylate-based resin (Q) | kind | Q-1 | Q-1 | Q-1 | Q-2 | Q-2 | Q-3 | Q-1 |
|  |  | Xb(wt %) | 49 | 49 | 49 | 56 | 56 | 42 | 49 |
|  | Impact resistance improver (R) | kind | R-1 | R-1 | R-1 | R-2 | R-2 | R-3 | R-1 |
|  |  | (wt %) | 21 | 21 | 21 | 14 | 14 | 28 | 21 |
|  | Impact resistance improver (R) (polyester-based) | kind | R-10 | R-10 | R-10 | R-10 | R-10 | R-10 | R-10 |
|  |  | (wt %) | 1 | 1 | 1 | 1 | 1 | 1 | 1 |
|  | Melt viscosity Vb | (Pa·s) | 1000 | 1000 | 1000 | 1100 | 1200 | 1300 | 1000 |
| Impact resistance improver (R) (polyester-based) dispersion diameter |  | (μm) | — | — | — | — | — | — | 0.7 |
| |Va − Vb| |  | (Pa·s) | 200 | 250 | 150 | 350 | 450 | 350 | 250 |
| Layer constitution |  |  | B/A/B | B/A/B | B/A/B | B/A/B | B/A/B | B/A/B | B/A/B |
| Thickness ratio |  |  | 1/8/1 | 1/8/1 | 1/8/1 | 1/8/1 | 1/8/1 | 1/8/1 | 1/8/1 |
| Impact resistance |  |  | ○ | ○ | ○ | ○ | ○ | ○ | Δ |
| Heat resistance |  |  | ○ | ○ | ○ | ○ | ○ | ○ | ○ |
| Biobased property (biobased content (%) = polylactic acid resin containing amount (wt %)) |  |  | ○ (81) | ○ (85) | ○ (73) | ○ (85) | ○ (85) | ○ (65) | ○ (81) |

TABLE 3

|  |  |  | Ex. 19 | Ex. 20 | Ex. 21 | Ex. 22 | Ex. 23 | Ex. 24 | Ex. 25 |
|---|---|---|---|---|---|---|---|---|---|
| Layer A | Polylactic acid-based resin (P) | kind | P-1 | P-1 | P-1 | P-1 | P-1 | P-1 | P-1 |
|  |  | (wt %) | 99 | 99 | 99 | 90 | 90 | 99 | 100 |
|  | Poly(meth)acrylate-based resin (Q) | kind | — | — | — | — | — | — | — |
|  |  | Xa(wt %) |  |  |  |  |  |  |  |
|  | Impact resistance improver (R) | kind |  |  |  |  |  |  |  |
|  |  | (wt %) |  |  |  |  |  |  |  |
|  | Impact resistance improver (R) (polyester-based) | kind | R-10 | R-10 | R-10 | R-7 | R-8 | R-10 | — |
|  |  | (wt %) | 1 | 1 | 1 | 10 | 10 | 1 | — |
|  | Melt viscosity Va | (Pa·s) | 750 | 750 | 750 | 500 | 500 | 750 | 800 |
| Layer B | Polylactic acid-based resin (P) | kind | P-1 | P-1 | — | P-2 | P-2 | P-1 | P-1 |
|  |  | (wt %) | 29 | 29 | — | 20 | 20 | 39 | 30 |

TABLE 3-continued

|  |  |  | Ex. 19 | Ex. 20 | Ex. 21 | Ex. 22 | Ex. 23 | Ex. 24 | Ex. 25 |
|---|---|---|---|---|---|---|---|---|---|
|  | Poly(meth)acrylate-based resin (Q) | kind | Q-1 | Q-1 | Q-1 | Q-1 | Q-1 | Q-1 | Q-1 |
|  |  | Xa(wt %) | 49 | 49 | 70 | 56 | 56 | 42 | 49 |
|  | Impact resistance improver (R) | kind | R-1 | R-1 | R-1 | R-1 | R-1 | R-1 | R-1 |
|  |  | (wt %) | 21 | 21 | 30 | 24 | 24 | 18 | 21 |
|  | Impact resistance improver (R) (polyester-based) | kind | R-10 | R-10 | — | — | — | R-10 | — |
|  |  | (wt %) | 1 | 1 | — | — | — | 1 | — |
|  | Melt viscosity Vb | (Pa·s) | 1000 | 1000 | 1300 | 900 | 900 | 950 | 1050 |
| Impact resistance improver (R) (polyester-based) dispersion diameter |  | (μm) | — | — | — | — | — | — | — |
| \|Va − Vb\| |  | (Pa·s) | 250 | 250 | 550 | 400 | 400 | 200 | 250 |
| Layer constitution |  |  | B/A/B | B/A/B | B/A/B | B/A/B | B/A/B | A/B/A | B/A/B |
| Thickness ratio |  |  | 3/4/3 | 0.5/9/0.5 | 1/8/1 | 1/8/1 | 1/8/1 | 1/8/1 | 1/8/1 |
| Impact resistance |  |  | ○ | ○ | ○ | ○ | ○ | ○ | ○ |
| Heat resistance |  |  | ○ | Δ | ○ | ○ | ○ | Δ | ○ |
| Biobased property |  |  | ○ | ○ | ○ | ○ | ○ | ○ | ○ |
| (biobased content (%) = polylactic acid resin containing amount (wt %)) |  |  | (57) | (92) | (79) | (81) | (81) | (52) | (86) |

TABLE 4

|  |  |  |  | Ex. 26 | Ex. 27 | Ex. 28 | Ex. 29 | Ex. 30 |
|---|---|---|---|---|---|---|---|---|
| Layer A | Polylactic acid-based resin (P) | kind |  | P-3 | P-1 | P-3 | P-3 | P-3 |
|  |  | Xap(wt %) |  | 90 | 100 | 90 | 70 | 90 |
|  |  | $n_p$ |  | 1.450 | 1.450 | 1.450 | 1.450 | 1.450 |
|  | Poly(meth)acrylate-based resin (Q) | kind |  | Q-1 | — | Q-3 | Q-3 | Q-1 |
|  |  | Xa(wt %) |  | 7 | — | 8 | 24 | 7 |
|  |  | $n_q$ |  | 1.490 | — | 1.490 | 1.490 | 1.490 |
|  | Impact resistance improver (R) | kind |  | R-1 | — | R-4 | R-6 | R-1 |
|  |  | Xar(wt %) |  | 3 | — | 2 | 6 | 3 |
|  |  | $n_r$ |  | 1.490 | — | 1.477 | 1.468 | 1.490 |
|  | X (= 100Xap/(Xap + Xa)) |  |  | 92.8 | 100.0 | 91.8 | 74.5 | 92.6 |
|  | \|xnp + (100 − x)nq − 100$n_r$\| |  |  | 3.7 | — | 2.4 | 0.8 | 3.7 |
|  | Melt viscosity Va | (Pa·s) |  | 850 | 830 | 810 | 910 | 850 |
| Layer B | Polylactic acid-based resin (P) | kind |  | P-2 | P-2 | P-2 | — | P-2 |
|  |  | Xbp(wt %) |  | 20 | 20 | 20 | — | 20 |
|  |  | $n_p$ |  | 1.450 | 1.450 | 1.450 | — | 1.450 |
|  | Poly(meth)acrylate-based resin (Q) | kind |  | Q-1 | Q-1 | Q-3 | Q-1 | Q-1 |
|  |  | Xb(wt %) |  | 56 | 56 | 64 | 70 | 56 |
|  |  | $n_q$ |  | 1.490 | 1.490 | 1.490 | 1.490 | 1.490 |
|  | Impact resistance improver (R) | kind |  | R-1 | R-1 | R-4 | R-1 | R-1 |
|  |  | Xbr(wt %) |  | 24 | 24 | 16 | 30 | 24 |
|  |  | $n_r$ |  | 1.490 | 1.490 | 1.477 | 1.490 | 1.490 |
|  | x (= 100Xbp/(Xbp + Xb)) |  |  | 26.3 | 26.3 | 23.8 | 0.0 | 26.3 |
|  | \|xnp + (100 − x)nq − 100$n_r$\| |  |  | 1.1 | 1.1 | 0.3 | 0.0 | 1.1 |
|  | Melt viscosity Vb | (Pa·s) |  | 1200 | 1200 | 1150 | 1500 | 1200 |
| Layer constitution |  |  |  | B/A/B | B/A/B | B/A/B | B/A/B | B/A/B |
| Thickness ratio of layers |  |  |  | 1/8/1 | 1/8/1 | 1/8/1 | 1/8/1 | 1/3/1 |
| Containing ratio of (Q) to whole composition | (wt %) |  |  | 16.8 | 11.2 | 19.2 | 33.2 | 26.6 |
| \|Va − Vb\| | (Pa·s) |  |  | 350 | 370 | 340 | 590 | 350 |
| Heat resistance |  |  |  | ○ | ○ | ○ | ○ | ○ |
| Impact resistance |  |  |  | ○ | ○ | ○ | ○ | ○ |
| Transparency (haze (%)) |  |  |  | ● | ● | ● | ● | ● |
|  |  |  |  | (5.2) | (2.5) | (2.9) | (1.1) | (3.9) |
| Biobased property (biobased content (%) = polylactic acid-based resin containing amount (wt %)) |  |  |  | ○ | ○ | ○ | ○ | ○ |
|  |  |  |  | (76) | (84) | (76) | (56) | (76) |

|  |  |  |  | Ex. 31 | Ex. 32 | Ex. 33 | Ex. 34 | Ex. 35 |
|---|---|---|---|---|---|---|---|---|
| Layer A | Polylactic acid-based resin (P) | kind |  | P-3 | P-3 | P-3 | P-3 | P-3 |
|  |  | Xap(wt %) |  | 50 | 50 | 50 | 50 | 80 |
|  |  | $n_p$ |  | 1.450 | 1.450 | 1.450 | 1.450 | 1.450 |
|  | Poly(meth)acrylate-based resin (Q) | kind |  | Q-2 | Q-2 | Q-2 | Q-2 | — |
|  |  | Xa(wt %) |  | 40 | 40 | 40 | 40 | — |
|  |  | $n_q$ |  | 1.490 | 1.490 | 1.490 | 1.490 | — |
|  | Impact resistance improver (R) | kind |  | R-6 | R-5 | R-6 | R-6 | R-5 |
|  |  | Xar(wt %) |  | 10 | 10 | 10 | 10 | 20 |
|  |  | $n_r$ |  | 1.468 | 1.490 | 1.468 | 1.468 | 1.490 |
|  | X (= 100Xap/(Xap + Xa)) |  |  | 55.6 | 55.6 | 55.6 | 55.6 | 100.0 |
|  | \|xnp + (100 − x)nq − 100$n_r$\| |  |  | 0.0 | 2.2 | 0.0 | 0.0 | 4.0 |
|  | Melt viscosity Va | (Pa·s) |  | 1000 | 1000 | 1000 | 1000 | 890 |

TABLE 4-continued

| | | | | | | | |
|---|---|---|---|---|---|---|---|
| Layer B | Polylactic acid-based resin (P) | kind | — | — | — | — | P-2 |
| | | Xbp(wt %) | — | — | — | — | 20 |
| | | $n_p$ | — | — | — | — | 1.450 |
| | Poly(meth)acrylate-based resin (Q) | kind | Q-2 | Q-2 | Q-2 | Q-2 | Q-1 |
| | | Xb(wt %) | 80 | 80 | 90 | 80 | 56 |
| | | $n_q$ | 1.490 | 1.490 | 1.490 | 1.490 | 1.490 |
| | Impact resistance improver (R) | kind | R-5 | R-5 | R-5 | R-5 | R-1 |
| | | Xbr(wt %) | 20 | 20 | 10 | 20 | 24 |
| | | $n_r$ | 1.490 | 1.490 | 1.490 | 1.490 | 1.490 |
| | x (= 100Xbp/(Xbp + Xb)) | | 0.0 | 0.0 | 0.0 | 0.0 | 26.3 |
| | |xnp + (100 − x)nq − 100n_r| | | 0.0 | 0.0 | 0.0 | 0.0 | 1.1 |
| | Melt viscosity Vb | (Pa · s) | 1650 | 1650 | 1650 | 1650 | 1200 |
| Layer constitution | | | B/A/B | B/A/B | B/A/B | A/B/A | B/A/B |
| Thickness ratio of layers | | | 1/3/1 | 1/3/1 | 1/3/1 | 1/3/1 | 1/3/1 |
| Containing ratio of (Q) to whole composition | | (wt %) | 56.0 | 56.0 | 56.0 | 64.0 | 22.4 |
| |Va − Vb| | | (Pa · s) | 650 | 650 | 650 | 650 | 310 |
| Heat resistance | | | ○ | ○ | ○ | ○ | ○ |
| Impact resistance | | | ○ | ○ | Δ | ○ | ○ |
| Transparency (haze (%)) | | | ● (0.4) | ○ (10.7) | ● (0.5) | ● (0.5) | Δ (20.8) |
| Biobased property (biobased content (%) = polylactic acid-based resin containing amount (wt %)) | | | Δ (30) | Δ (30) | Δ (30) | Δ (20) | ○ (56) |

TABLE 5

| | | | Comp. ex. 1 | Comp. ex. 2 | Comp. ex. 3 |
|---|---|---|---|---|---|
| Layer A | Polylactic acid-based resin (P) | kind | P-1 | P-1 | P-1 |
| | | (wt %) | 70 | 50 | 30 |
| | Poly(meth)acrylate-based resin (Q) | kind | Q-6 | Q-5 | Q-4 |
| | | Xa(wt %) | 30 | 50 | 70 |
| | Impact resistance improver (R) | kind | — | — | — |
| | | (wt %) | — | — | — |
| Layer B | Polylactic acid-based resin (P) | kind | P-1 | P-1 | P-1 |
| | | (wt %) | 70 | 50 | 30 |
| | Poly(meth)acrylate-based resin (Q) | kind | Q-6 | Q-5 | Q-4 |
| | | Xb(wt %) | 30 | 50 | 70 |
| | Impact resistance improver (R) | kind | — | — | — |
| | | (wt %) | — | — | — |
| Layer constitution | | | B/A/B | B/A/B | B/A/B |
| Thickness ratio | | | 1/8/1 | 1/8/1 | 1/8/1 |
| Structural period | | (μm) | 0.1 | — | — |
| Impact resistance | | | Δ | X | X |
| Heat resistance | | | X | Δ | ○ |
| Biobased property (biobased content (%) = polylactic acid resin containing amount (wt %)) | | | ○ (70) | ○ (50) | Δ (30) |

TABLE 6

| | | | Comp. ex. 4 | Comp. ex. 5 | Comp. ex. 6 | Comp. ex. 7 |
|---|---|---|---|---|---|---|
| Layer A | Polylactic acid-based resin (P) | kind | P-1 | P-1 | P-1 | P-1 |
| | | (wt %) | 100 | 70 | 50 | 30 |
| | Poly(meth)acrylate-based resin (Q) | kind | — | Q-1 | Q-1 | Q-1 |
| | | Xa(wt %) | — | 21 | 35 | 49 |
| | Impact resistance improver (R) | kind | — | R-1 | R-1 | R-1 |
| | | (wt %) | — | 9 | 15 | 21 |
| | Impact resistance improver (R) (polyester-based) | kind | — | — | — | — |
| | | (wt %) | — | — | — | — |
| | melt viscosity Va | (Pa · s) | 800 | 950 | 1000 | 1050 |
| Layer B | Polylactic acid-based resin (P) | kind | P-1 | P-1 | P-1 | P-1 |
| | | (wt %) | 100 | 70 | 50 | 30 |
| | Poly(meth)acrylate-based resin (Q) | kind | — | Q-1 | Q-1 | Q-1 |
| | | Xa(wt %) | — | 21 | 35 | 49 |
| | Impact resistance improver (R) | kind | — | R-1 | R-1 | R-1 |
| | | (wt %) | — | 9 | 15 | 21 |
| | Impact resistance improver (R) (polyester-based) | kind | — | — | — | — |
| | | (wt %) | — | — | — | — |
| | Melt viscosity Vb | (Pa · s) | 800 | 950 | 1000 | 1050 |
| Impact resistance improver (R) (polyester-based) dispersion diameter | | (μm) | — | — | — | — |
| |Va − Vb| | | (Pa · s) | 0 | 0 | 0 | 0 |
| Layer constitution | | | B/A/B | B/A/B | B/A/B | B/A/B |
| Thickness ratio | | | 1/8/1 | 1/8/1 | 1/8/1 | 1/8/1 |
| Impact resistance | | | Δ | Δ | X | X |

TABLE 6-continued

|  | Comp. ex. 4 | Comp. ex. 5 | Comp. ex. 6 | Comp. ex. 7 |
|---|---|---|---|---|
| Heat resistance | X | X | Δ | ○ |
| Biobased property | ○ | ○ | ○ | Δ |
| (biobased content (%) = polylactic acid resin containing amount (wt %)) | (100) | (70) | (50) | (30) |

Codes in Table 4 denote the following:

Xap: containing ratio (wt %) of polylactic acid-based resin with respect to the whole polylactic acid-based resin composition constituting Layer A Xar: containing ratio (wt %) of impact resistance improver with respect to whole polylactic acid-based resin composition constituting Layer A Xbp: containing ratio (wt %) of polylactic acid-based resin with respect to whole polylactic acid-based resin composition constituting Layer B Xbr: containing ratio (wt %) of impact resistance improver with respect to whole polylactic acid-based resin composition constituting Layer B.

The polylactic acid-based resin laminate sheets of Examples 2 to 35 were in the range of practical use in impact resistance, and the heat resistances of molded product obtained from the sheet were good, and their biobased contents were 20% or more.

On the other hand, in Comparative examples, although the biobased properties of molded products obtained from the sheet of polylactic acid only were high, they were poor in heat resistance (Comparative example 4). In cases where containing amounts of polymethyl methacrylate in Layer A and Layer B were same, it was impossible that biobased property, heat resistance, and impact resistance were compatible (Comparative examples 1 to 3 and 3 to 7).

INDUSTRIAL APPLICABILITY

The laminate sheet of polylactic acid-based resin can be used in wide applications, not only for various industrial materials such as shape retainers including blister pack used for presentation packaging of commercial goods, trays for food, bottles for display of beverage vending machine, containers including lunch box or cup for beverage, other molded product for various wrappings and surface materials.

The laminate sheet of polylactic acid-based resin can be applied to various molding methods such as vacuum molding, vacuum molding, plug assist molding, straight molding, free drawing molding, plug and ring molding and skeleton molding, and has a high moldability. It can preferably be used, in particular, for various shape retainers and wrapping materials such as container in which heat resistance and transparency are required.

The invention claimed is:

1. A polylactic acid-based resin laminate sheet comprising:
   1) a Layer A and a Layer B of polylactic acid-based resin compositions each containing poly(meth)acrylate-based resin, and, said Layer A and said Layer B satisfy the following condition (a):

$$0 \leq Xa < Xb \quad (a)$$

wherein,
   Xa: is a ratio (wt %) of poly(meth)acrylate-based resin with respect to whole polylactic acid-based resin composition constituting said Layer A
   Xb: is a ratio (wt %) of poly(meth)acrylate-based resin with respect to whole polylactic acid-based resin composition constituting said Layer B, and
   2) an impact resistance improver in at least one of Layers A and B, wherein all layers constituting the sheet satisfy the following condition (b):

$$[xn_p + (100-x)n_q - 100n_r] < 4 \quad (b)$$

wherein,
   x: is a ratio (wt %) of the polylactic acid-based resin based on 100 wt % of total of the polylatic acid-based resin and the poly(meth)acrylate-based resin
   $n_p$: refractive index of the polylactic acid-based resin
   $n_q$: refractive index of the poly(meth)acrylate-based resin
   $n_r$: refractive index of the impact resistance improver.

2. The polylactic acid-based resin laminate sheet according to claim 1, containing 10 to 95 wt % of the polylactic acid resin based on the whole resin composition constituting the polylactic acid-based laminate sheet.

3. The polylactic acid-based resin laminate sheet according to claim 1, containing 30 to 100 wt % of the poly(meth) acrylate-based resin plus said impact resistance improver based on said whole polylactic acid-based resin composition constituting said Layer B.

4. The polylactic acid-based resin laminate sheet according to claim 1, wherein a melt viscosity Va(Pa·s) of the resin constituting said Layer A and a melt viscosity Vb(Pa·s) of the resin constituting said Layer B, at a temperature of 220° C. and a shear rate of 100 sec$^{-1}$, satisfy the following conditions:

$$500 \leq Va \leq 1500$$

$$500 \leq Vb \leq 1500$$

$$|Va - Vb| \leq 700.$$

5. The polylactic acid-based resin laminate sheet according to claim 1, wherein respective thickness ratios of Layer A and Layer B with respect to the whole thickness of said polylactic acid-based resin laminate sheet are 10 to 90%.

6. The polylactic acid-based resin laminate sheet according to claim 1, wherein said impact resistance improver is a polyester-based resin of which glass transition temperature is 60° C. or less.

7. The polylactic acid-based resin laminate sheet according to claim 1, wherein the above-mentioned impact resistance improver is a multilayer structure organic fine particle which has a core portion and 1 or more shell portions covering thereon.

8. A molded product which is constituted by the polylactic acid-based resin laminate sheet described in any one of claims 1-7.

* * * * *

UNITED STATES PATENT AND TRADEMARK OFFICE
CERTIFICATE OF CORRECTION

PATENT NO.        : 7,799,412 B2
APPLICATION NO.   : 12/094610
DATED             : September 21, 2010
INVENTOR(S)       : Yamamura et al.

It is certified that error appears in the above-identified patent and that said Letters Patent is hereby corrected as shown below:

In the Specification:

In Column 6

At line 42, please change "6° C" to --60° C--.

In Column 32

At Table 4, at the Subheading "Ex. 30", at row 10, please change "92.6" to --92.8--.

Signed and Sealed this
Twenty-second Day of February, 2011

David J. Kappos
*Director of the United States Patent and Trademark Office*